United States Patent [19]

Usuki et al.

[11] Patent Number: 5,774,096
[45] Date of Patent: Jun. 30, 1998

[54] HEAD MOUNTED DISPLAY

[75] Inventors: Yoshinao Usuki; Masaki Matsuno; Futoshi Ito; Kenji Tosaki, all of Tokyo, Japan

[73] Assignee: Kabushiki Kaisha Sega Enterprises, Tokyo, Japan

[21] Appl. No.: 426,168

[22] Filed: Apr. 20, 1995

[30]  Foreign Application Priority Data

| Apr. 21, 1994 | [JP] | Japan | 6-105070 |
| Apr. 21, 1994 | [JP] | Japan | 6-107796 |
| Jul. 8, 1994 | [JP] | Japan | 6-157587 |
| Jul. 15, 1994 | [JP] | Japan | 6-164199 |

[51] Int. Cl.$^6$ .................................................. G09G 5/00
[52] U.S. Cl. .............................. 345/8; 340/980; 359/630
[58] Field of Search ................. 345/7, 8, 9; 359/630, 359/631, 13, 14; 340/980; 348/121, 795, 61

[56]  References Cited

U.S. PATENT DOCUMENTS

| 4,395,731 | 7/1983 | Schoolman | 358/88 |
| 4,636,866 | 1/1987 | Hattori | 358/236 |
| 4,651,201 | 3/1987 | Schoolman | 358/98 |
| 5,321,416 | 6/1994 | Bassett et al. | 345/8 |
| 5,451,976 | 9/1995 | Ito | 345/8 |
| 5,485,172 | 1/1996 | Sawachika et al. | 345/8 |
| 5,589,846 | 12/1996 | Kobayashi | 345/8 |

FOREIGN PATENT DOCUMENTS

| 0 572 284 | 12/1993 | European Pat. Off. . |
| 0 575 257 | 12/1993 | European Pat. Off. . |
| 0 592 318 | 4/1994 | European Pat. Off. . |
| 39 27 253 | 2/1991 | Germany . |
| 1-133479 | 5/1989 | Japan . |
| 52-20186 | 8/1993 | Japan . |
| 92/02388 | 2/1992 | WIPO . |
| 92/03756 | 3/1992 | WIPO . |

*Primary Examiner*—Dennis-Doom Chow
*Attorney, Agent, or Firm*—Finnegan, Henderson, Farabow, Garrett & Dunner, L.L.P.

[57]  ABSTRACT

A head mounted display comprising: a display device 2 at the front; a front frame 12 surrounding the forehead; a back frame 14 surrounding the back portion of the head; connecting devices 30A and 30B for connecting the front frame 12 and the back frame 14 in a manner freely movable toward the back and front of the head; belts 16A and 16B placed on the inner surface of both the front frame 12 and the back frame 14 and around the temples; and a belt fastening and loosening device 20 for fastening the belts 16A and 16B and for releasing the fastened belts.

11 Claims, 34 Drawing Sheets

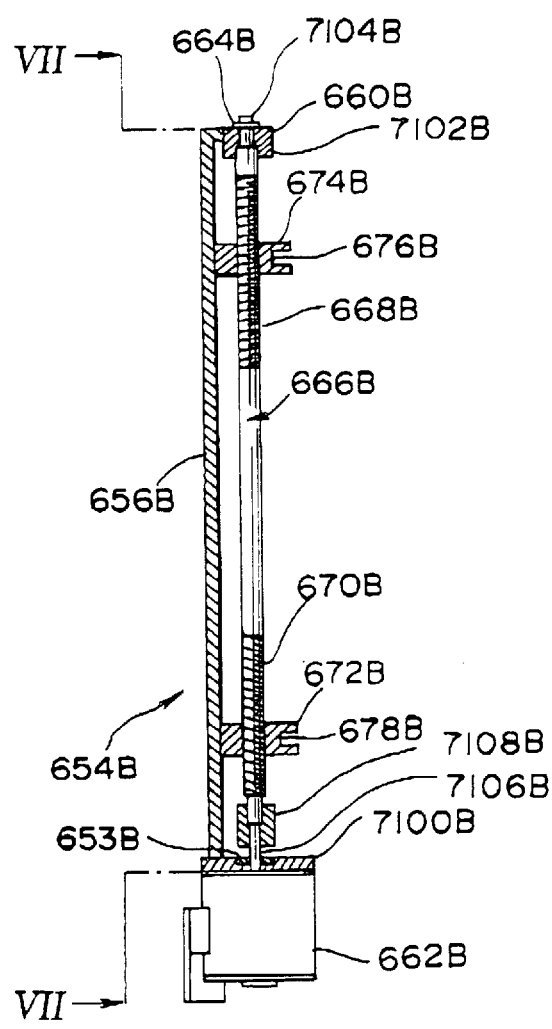
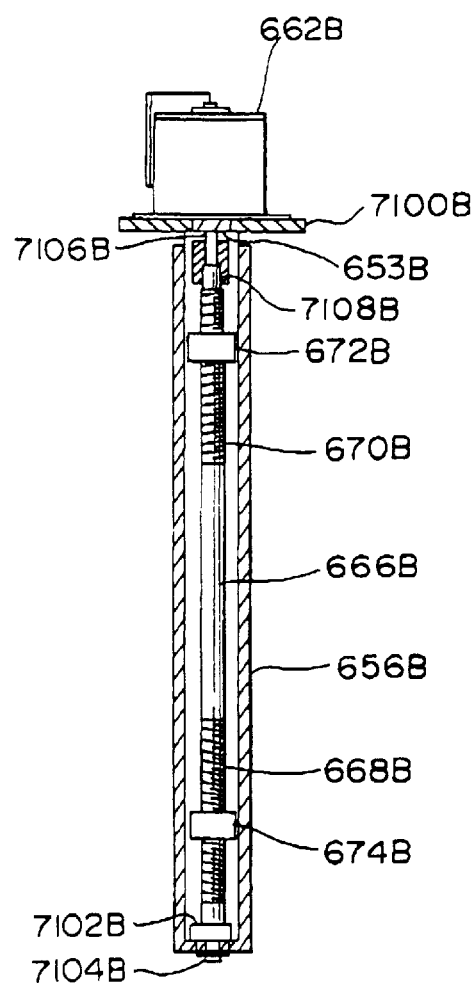
FIG.39
FIG.40

HEAD MOUNTED DISPLAY

BACKGROUND OF THE INVENTION

1. Field of the Invention

This invention relates to a head mounted display (hereinafter referred to as "HMD") for watching images projected from a display and for listening to sound by putting it on the head, and also relates to an image display system which utilizes the HMD.

2. Description or the Prior Art

The HMD has been used as a device for watching images projected from a display device placed on the front side of the HMD by putting it on the head. The display device provided in the HMD usually comprises liquid-crystal panels which display desirable images at positions respectively close to a right eye and a left eye. In this display device, the liquid-crystal panels are inclined against the eyes to artificially set the angle formed by the lines of sight (hereinafter referred to as "convergence angle"). Hence the display device is capable of forming the same images as those formed when fixing the eyes on a position 1 to 2 meters away. Moreover, a predetermined angle of visual field (angle of horizontal view) can be formed by supplying the images of the liquid-crystal panels through lenses. Images projected from the right and left liquid-crystal panels are synthesized to form a binocular image, thereby enabling the reproduction of wide-angle images with an enlarged angle of visual field and of three-dimensional images.

This HMD can be used in various fields, for example, in order to play games in three-dimensional space (virtual space) or to simulate, for example, the interior of a building in a three-dimensional mode.

One example of this type of HMD is one with the above-described display device supported by a head band which is fastened to the head of a player, that is, a user, thereby securing the display device on the head.

As another example, there is an HMD with a slide-type frame, length of which is adjusted to definitely secure the display device on the head. This slide-type HMD comprises, for example, a front frame with a display device on its front side, and a back frame which is assembled with the front frame in a slidable manner. Bands with racks are provided at both ends of the front frame. These bands are introduced into the back frame, and a pinion which engages the racks is inserted into and set at the above-mentioned racks. By turning this pinion, the distance between the front frame and the back frame is adjusted, thereby enabling the attachment and detachment of the HMD to and from the head.

With this type of HMD, it is necessary to adjust the positions of the right and left liquid-crystal panels according to the distance between a player's eyes in order to obtain good images. It is also necessary to adjust the angle formed by the optical axes of the liquid-crystal panels in accordance with the type and content of images in order to obtain predetermined wide-angle images and three-dimensional images.

In conventional HMD's, the positions of the liquid-crystal panels are fixed in a general manner. Even if the positions of the liquid-crystal panels can be adjusted, it is only possible to do so by manual operations. Therefore, it is difficult to adjust the positions of the liquid-crystal panels quickly and accurately according to the distance between the eyes for each player.

There is also a similar problem with regard to adjustment of the angle formed by the optical axes of the liquid-crystal panels when a player is watching a reproduced screen. It is difficult to switch images from one to another as appropriate and in real time, among three-dimensional images, wide images, and combined images of these two kinds, in accordance with the type and content of the images, When playing a game with this HMD, the player sometimes moves his/her head fiercely depending on the content of the game. With the HMD which is constructed so as to fasten the above-mentioned bands to the head, it is difficult to sufficiently support the display, which is a heavy material, with the head bands, resulting In problems such that the head band s bend or the HMD slips off the head. Accordingly, there are some problems in that the HMD drops off the head during the game, the HMD cannot stay at its original position on the head, and the comfort while wearing the HMD on the head decreases.

On the other hand, if the HMD is constructed so as to fasten the above-described frames to the head, the frame portions are rigid compared to the aforementioned HMD which utilizes the head bands and, therefore, there is no problem like the bending of the frames. However, there is a problem that a user cannot feel satisfactorily comfortable when wearing the HMD. Moreover, there is another problem in that the HMD drops off the head if the player moves her head fiercely when using the HMD, and the HMD hardly stays at a certain position when it is put on the head.

With the HMD constructed so as to fasten the frames to the head, in order to take the HMD off the head, it is necessary to turn the handle provided on the pinion fully to expand the distance between the front frame and the back frame so that the HMD can be completely taken off the head. Accordingly, there is a problem that it is difficult to put on the HMD and take it off the head. Moreover, since the handle is mounted on the back side of the head in this HMD, it is hard to operate the handle.

Furthermore, HMD's at amusement parks, game centers, etc. are used by many and unspecified players. Conventional HMD's are generally constructed in a manner such that a player's eye regions touch the lens surfaces, etc. as in the case of a binocular with eye cups. The speaker portions of headphones are generally constructed in a manner such that, for example, earphones are inserted into the ears, Just like speaker portions used for audio equipment, so that the speaker portions touch the player's ears directly. Accordingly, there is a problem that such constructions in direct contact with the eyes, ears and other body parts of many and unspecified people are not preferable for sanitary reasons.

This invention aims to solve the above-described problems of the prior art. An objective of the invention is to provide an HMD which has a display device capable of being secured on the head with certainty, which realizes fully improved comfort when it is put on the head, and which can certainly maintain an optimal position while wearing, even if the head is moved fiercely.

Another objective of the invention is to provide an HMD capable of adjusting the positions of the image display unit portions easily, accurately and quickly according to the distance between the eyes for each player.

A further objective of the invention is to provide an HMD also capable of adjusting the angle formed by the optical axes of the image display unit portions, which correspond with the lines of sight of a player.

Another further objective of the invention is to provide an image display system capable of quickly forming appropriate three-dimensional images, wide images, or combined images of these two kinds in accordance with the content or type of images by using the above-described HMD.

A further objective of the invention is to provide an HMD which is sanitary even if it is used by many and unspecified players.

A further objective of the invention is to provide an HMD which easily enables model changes.

SUMMARY OF THE INVENTION

The HMD of this invention comprises: a front frame which comprises a display device on the front side and which covers the forehead; a back frame which covers the back portion of the head; connecting means for connecting the front frame and the back frame in a manner freely movable toward the directions of the back and front of the head; belts which are placed on the inside surfaces of both the front frame and the back frame and around the temporal regions of the head; a fastening means for fastening the belts; and a loosening means for loosening the fastened belts.

The fastening means comprises: racks having teeth opposite to each other which are mounted in the lengthwise direction of the belts; a pinion which is mounted on the back frame and engages with the racks; and a shaft having, at its tip portion, an engagement portion which is Inserted into and engages with the shaft pocket of the pinion. The racks and pinion engage with each other by ordinarily biasing the tip portion of the shaft against the shaft pocket of the pinion, and such engagement is released by pulling back the tip portion of the shaft in a direction opposite to the biasing direction.

The connecting means comprises: first engagement members placed on both side ends of the front frame; and second engagement members which are placed on both side ends of the back frame and which move relative to one another in the directions of the back and front of the head while being engaged with the first engagement members.

Either the first engagement members or the second engagement members comprises a rail, and the other engagement member comprises a slider which moves while engaged with the rail.

A pair of belts is provided, each belt has a rack on the side end closer to the fastening means, and the fastening means comprises a pinion to engage with the rack.

The HMD may comprise pad members which can be pressed to the temporal regions when the head mounted display is mounted on the head.

The HMD may comprise: an air bag which expands and shrinks in accordance with the amount of air injected and which can at least be pressed to the temporal regions of the head; and an air supply and exhaust device which performs the supplying of and exhausting of air into and from the air bag.

The HMD may comprise a pad member which can be pressed to the vertex of the head when the head mounted display is mounted on the head.

A cord to be connected to the display device is extended from the central portion of the back frame.

The end of the cord not attached to the back frame is placed at a higher position than that of the other end of the cord attached to the back frame side.

The fastening means and loosening means are placed at a position offset from the central portion of the back frame.

The cord to be connected to the display device may be united with the air supply and exhaust device.

The end of the cord not attached to the back frame is connected to a cord adjustment device which winds and unwinds the cord.

A UV cut filter may be placed on the front face of the display screen of the display device.

The display device is positioned at a predetermined distance from the eyes and the speakers are positioned at a predetermined distance from the ears when the head mounted display is mounted on the head.

Each frame comprises a frame body and an outer casing, and the outer casing is constructed in a manner freely attachable to and detachable from the frame body.

The display device comprises: a first display device which displays images for a right eye; a second display device which displays images for a left eye; a support means for supporting the first display device at a position opposite to the right eye and for supporting the second display device at a position opposite to the left eye; a position adjustment means for the first and second display devices; and a dynamo-electric means for driving the position adjustment means.

The position adjustment means comprises: a moving means for moving the first and second display devices closer to or away from each other; and a rotating means for changing the angle formed by the optical axis of the first display device for the right eye and the optical axis of the second display device for the left eye.

The support means consists of a pair of shafts with inverse screws formed thereon, electric motors, which are a dynamo-electric means, are connected to the shafts, the first and second display devices are supported by respectively being screwed to each of the pair of inverse screws, and the first and second display devices comprise a moving structure along the shafts by rotation of the electric motors.

The HMD comprises the first and second shafts. The first shaft supports the front-end side of the first and second display devices, the second shaft supports the base-end side of the first and second display devices, and an electric motor is connected to the end of each shaft in order to rotate the shaft.

The moving means, the rotating means, and a drive motor for driving these respective means are mounted respectively on the first and second display devices.

An image display system of this invention comprises: an HMD; an image control means for outputting picture signals to the first and second display devices; and a means for controlling the dynamo-electric means which generates drive signals for the dynamo-electric means in accordance with the picture signals and outputs such drive signals to the dynamo-electric means.

The means for controlling the dynamo-electric means calculates the amount of rotation of the first and second display means according to the picture signals, and outputs drive signals according to a calculated amount of rotation to the dynamo-electric means.

The image display system comprises a memory means for storing, for each individual person, the distance between the first display device and the second display device according to the distance between the eyes of each individual person.

DESCRIPTION OF THE DRAWINGS

FIG. 39 is a sectional view of the image display units taken through line VI—VI of FIG. 36.

FIG. 40 is a sectional view of the image display units taken through line VII—VII of FIG. 39.

DETAILED DESCRIPTION OF THE PREFERRED EMBODIMENTS

Figure 1:
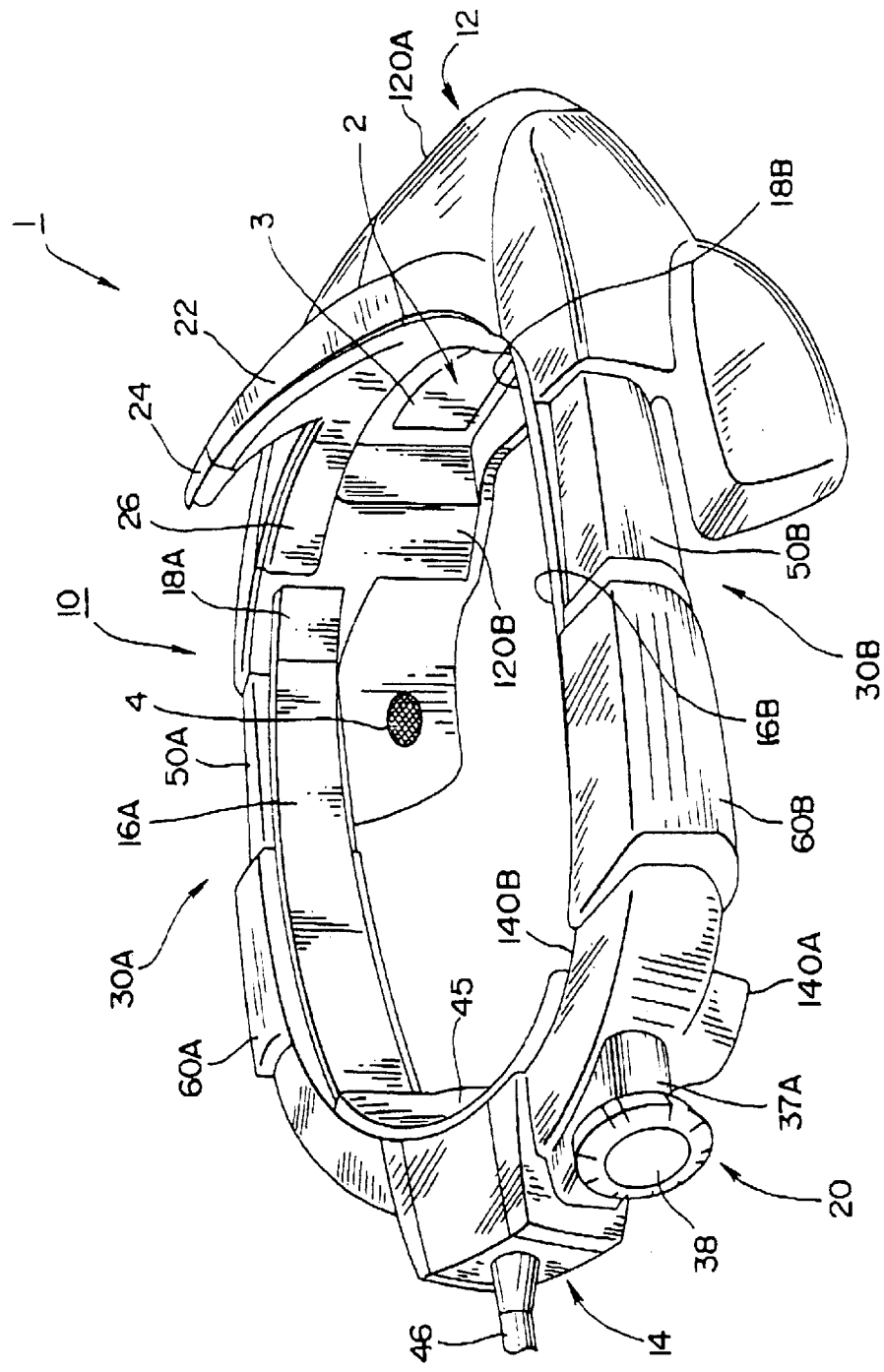
FIG. 1 is a perspective view of the HMD of Example 1 of the present invention.

Examples of the invention are hereinafter explained with reference to the drawings.

EXAMPLE 1

HMD 1 shown in FIGS. 1 through 6 is constructed by comprising a display device 2 for projecting desirable images, and a mounting device 10 for wearing and supporting the display device 2 on the head.

The mounting device 10 is capable of surrounding the forehead and covering both eyes and both ears. The mounting device 10 comprises: a front frame 12 in the shape of a substantial half ring which is hollow and the inside surface of which is curved to fit the shape of the forehead; a back frame 14 in the shape of a substantial half ring which is hollow and the inside surface of which is curved to fit the shape of the back portion of the head; and connecting devices 30A and 30B which are placed at both ends of the front frame 12 and the back frame 14, and which connect the front frame 12 and the back frame 14 in a manner freely movable toward the directions of the back and front of the head.

On the front frame 12, the display device 2 is provided at a position opposite both eyes when the HMD is mounted on the head. This display device 2 is recessed on the inside surface of the front frame so that a display screen 3 can be placed at a position which is at a predetermined distance from the eyes when the HMD 1 is put on the head. This makes it possible to prevent a player's eye regions from directly touching the display device 2, thereby making the HMD 1 superior in respect to sanitation. Moreover, it is possible to diminish the load imposed on the player's eyes if a UV cut filter is placed on the front side (the surface closer to the eyes) of the display screen 3.

Further, on the front frame 12, speakers 4 for outputting predetermined sounds are placed at positions opposite both ears. These speakers 4 are recessed on the inside surface of the front frame 12 so that they can be placed at a predetermined distance from the ears when the HMD 1 is put on the head. This makes it possible to prevent the player's ears from directly touching speakers 4, thereby making the HMD 1 superior in respect to sanitation.

Figure 2:
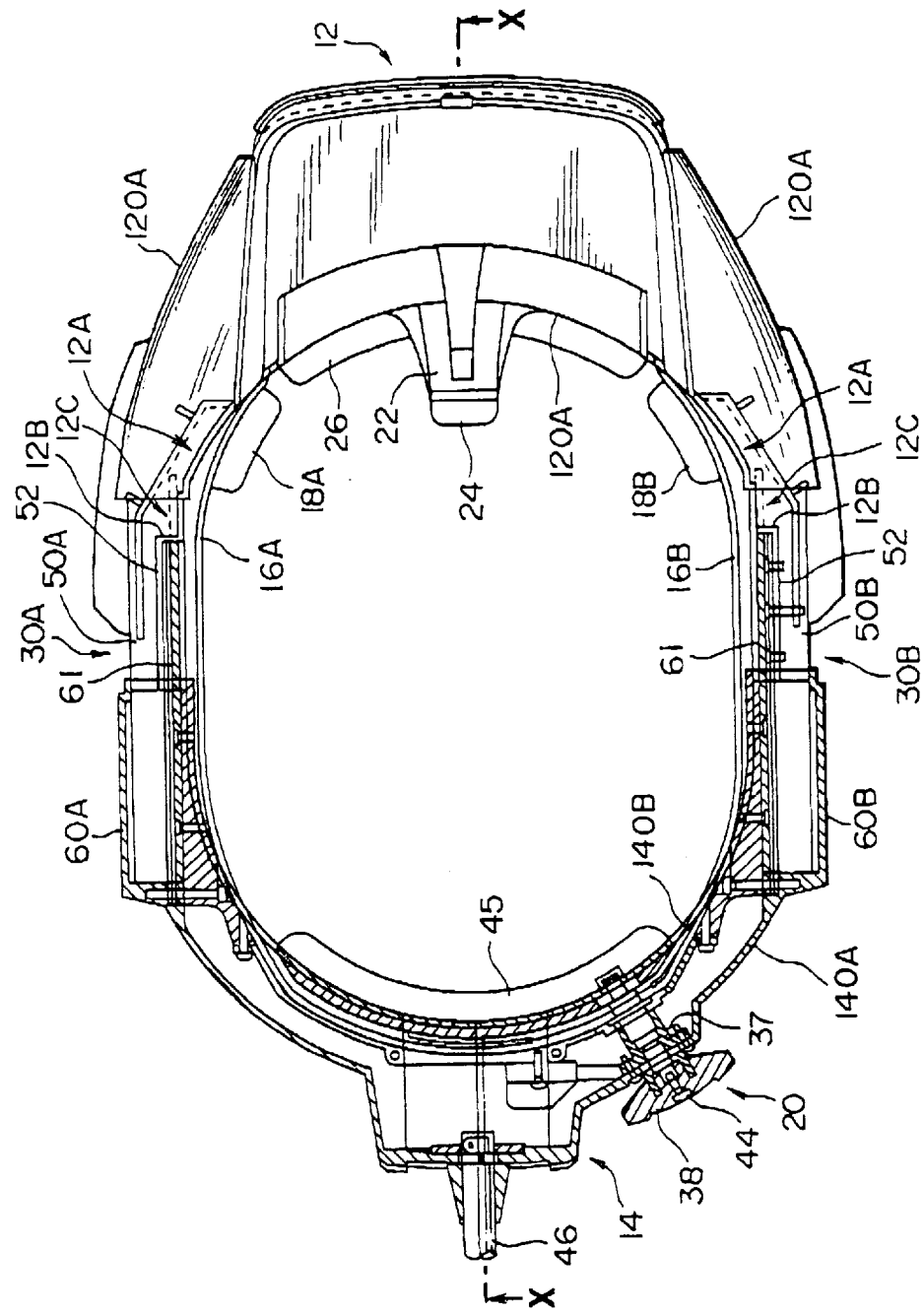
FIG. 2 is a plan view of the HMD shown in FIG. 1.

As shown in FIG. 2, a pair of belts 16A and 16B which surround the temporal regions of the head are secured with their ends at positions on the inside surfaces of the front frame 12 and corresponding to the temples of a player. Pad members 18A and 18B, which are to be pressed to both temples when the HMD 1 is put on the head, are formed at the installing ends of the belts 16A and 16B in a manner protruding toward the inside of the HMD 1. At the center of the front frame 12, a curved support member 22 is placed, extending from the forehead to a position adjacent to the vertex of the head. At one end of the support element 22, on the vertex side, a pad member 24 which can be pressed to the vertex, is provided. Moreover, at the portion of the front frame 12 corresponding to the forehead, a pad member 26 which can be pressed to the forehead is placed.

Although not specifically illustrated in the drawings, this front frame 12 has a construction in which its outer part, that is, an outer casing 120A, can be freely attached to and detached from its inside body part, that is, a body 120B of the front frame 12 where the aforementioned display device 2, belts 16A and 16B, speakers 4, etc. are mounted. In this Example 1, the outer casing 120A is secured on the body 120B of the front frame 12 in a freely attachable and detachable manner with screws or other similar materials. In fact, the outer casing 120A and the body 120B may be secured in a freely attachable and detachable manner by using an engagement member which is capable of engaging them, without using screws or other similar materials.

By constructing the outer casing 120A so as to make it freely attachable to and detachable from the body 120B of the front frame 12, the outer casing 120A can be easily replaced with a new one as necessary. For example, model changes can be performed easily.

Figure 5:
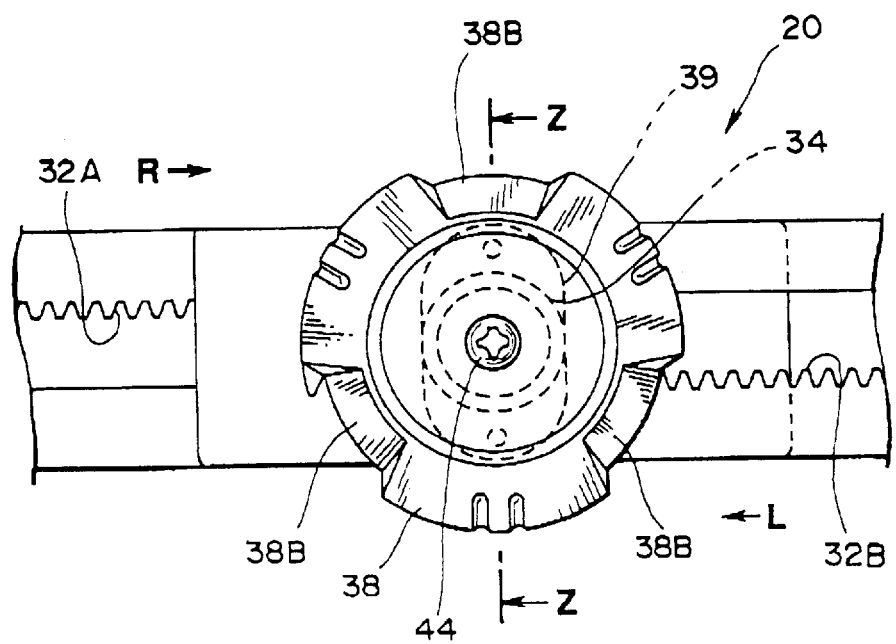
FIG. 5 is a partial rear view of the HMD shown in FIG. 1.

As shown in FIG. 5, racks 32A and 32B are formed at the other ends, that is, free ends opposite the installing ends, of the belts 16A and 16B. These racks 32A and 32B are provided at the portions of the belts which overlap with a belt fastening and loosening device 20 (hereinafter described in detail) so that the racks 32A and 32B always engage with a pinion 34 of the belt fastening and loosening device 20. In other words, the belts 16A and 16B are long enough to retain the state of engagement between the pinion 34 and the racks 32A and 32B even when the belt fastening and loosening device 20 is moved to the maximum point in the belt fastening or loosening direction, and when the front frame 12 and the back frame 14 are moved respectively to the maximum point toward the forehead or the back portion of the head.

Figure 6:
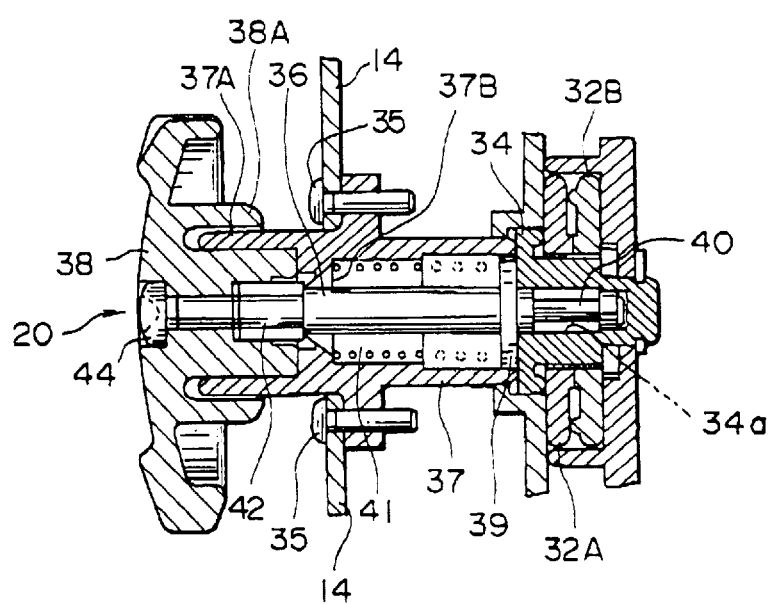
FIG. 6 is a sectional view of the part of HMD taken through line Z—Z of FIG. 5.

The aforementioned belt fastening or loosening device 20 is hereinafter explained in detail. As shown in FIG. 2, the belt fastening and loosening device 20 is provided at the position corresponding to the right back portion of the head, that is, at the position offset to the right from the center of the back frame 14. Placement of the belt fastening and loosening device 20 at the position offset to the right from the center of the back frame 14 enables easy operation of the belt fastening and loosening device 20 by a player without being interrupted by a cord 46. As explained later, it is possible to extend the cord 46 from the center of the back frame 14. As shown in FIGS. 5 and 6, the belt fastening and loosening device 20 comprises: a shaft 36 for giving rotation power to the pinion 34; and a handle 38 for rotating the shaft 36.

Shaft 36 is placed in a housing 37, which is secured with a screw 35 on the back frame 14, in a condition such that the shaft 36 can be pushed in toward the direction of the front frame 12. At the end of the shaft 36 closer to the front frame 12, an engagement portion 40 with an equilateral hexagonal section is formed, and this engagement portion 40 engages with a pocket in an equilateral hexagonal shape which is opened in the central part of the pinion 34 in a freely attachable and detachable manner (this structure will be later explained in detail). In other words, it is constructed so as to transmit the rotational force of the shaft through the engagement portion 40 to the pinion 34. A flange 39 is provided on the shaft 36 in a manner such that the flange 39 touches the end face, closer to the handle 38, of the pinion 34 when the engagement portion 40 is made to engage with the shaft pocket 34a which is open in the central portion of the pinion 34. A coil spring 41, which is an elastic member, for pressing the flange 39 to the shaft 36 toward the direction of the front frame 12 is set between the flange 39 and a narrow pocket portion 37B of which diameter is smaller than that of the pocket of the housing 37 for the shaft 36.

On the other side of the shaft 36, the handle 38, as a rotating member for rotating the shaft 36, is secured with a hexagon nut 42 and a hexagon head bolt 44 (which are united with the shaft 36). One end of the housing 37 closer to the handle 38 is formed as a protruded flange 37A which is hollow in the middle and has its edge protruding perpendicularly toward the handle 38. This protruding flange 37A fits in and engages with the circumferential groove formed in the thickness direction of the handle 38. Gears are formed along the inner wall 38A of the handle 38 facing the protruding flange 37A and along the inner wall of the handle 38 facing the protruding flange 37A so that these gears engage with each other. Accordingly, by turning the handle 38, the handle 38 moves back against the force of the coil spring 41 in the direction away from the pinion 34, and the handle 38 turns around the protruding flange 37A while maintaining the engagement between the gear of the protruding flange 37A and the gear of the inner wall 38A. At the same time, the handle 38 rotates the shaft 36 and transmits the rotational force to the pinion 34.

On the other hand, when the handle 38 is not operated, the handle 38 is in engagement with the protruding flange 37A of the housing 37 and hence the handle 38 is locked. The aforementioned pinion 34 is engaged with the racks 32A and 32B provided at the ends of the belts 16A and 16B. As shown in FIG. 5, when the handle 38 is turned in the clockwise direction, the rack 32B moves in the direction of the arrow R and simultaneously the rack 32A moves in the direction of the arrow L, so that the racks 32A and 32B move in the above respective directions to fasten the belts to the head. When the handle 38 is turned in the counterclockwise direction, the fastened belts are loosened.

Indented portions 38B are formed on the handle 38 so that a player can touch such indented portions 38B with fingers when turning the handle 38, which makes it easier to turn the handle 38.

The belt fastening and loosening device 20 has a construction in which by pulling the handle 38 (in the direction away from the front frame 12), the flange 39 moves to the left in FIG. 6 against the force of the coil spring 41, the engagement portion 40 is removed from the pocket opened in the middle of the pinion 34, and the engagement portion 40 is disengaged from such pocket at once. Namely, the disengagement of the engagement portion 40 from the pocket makes the pinion 34 free, and the fastened belts 16A and 16B can be easily loosened. In other words, the loosening device of the invention comprises a belt fastening and loosening device 20.

A pad member 45, which can be pressed to the back portion of the head, is placed at a portion of the back frame 14 corresponding to the back portion of the head (see FIG. 1).

Figure 3:
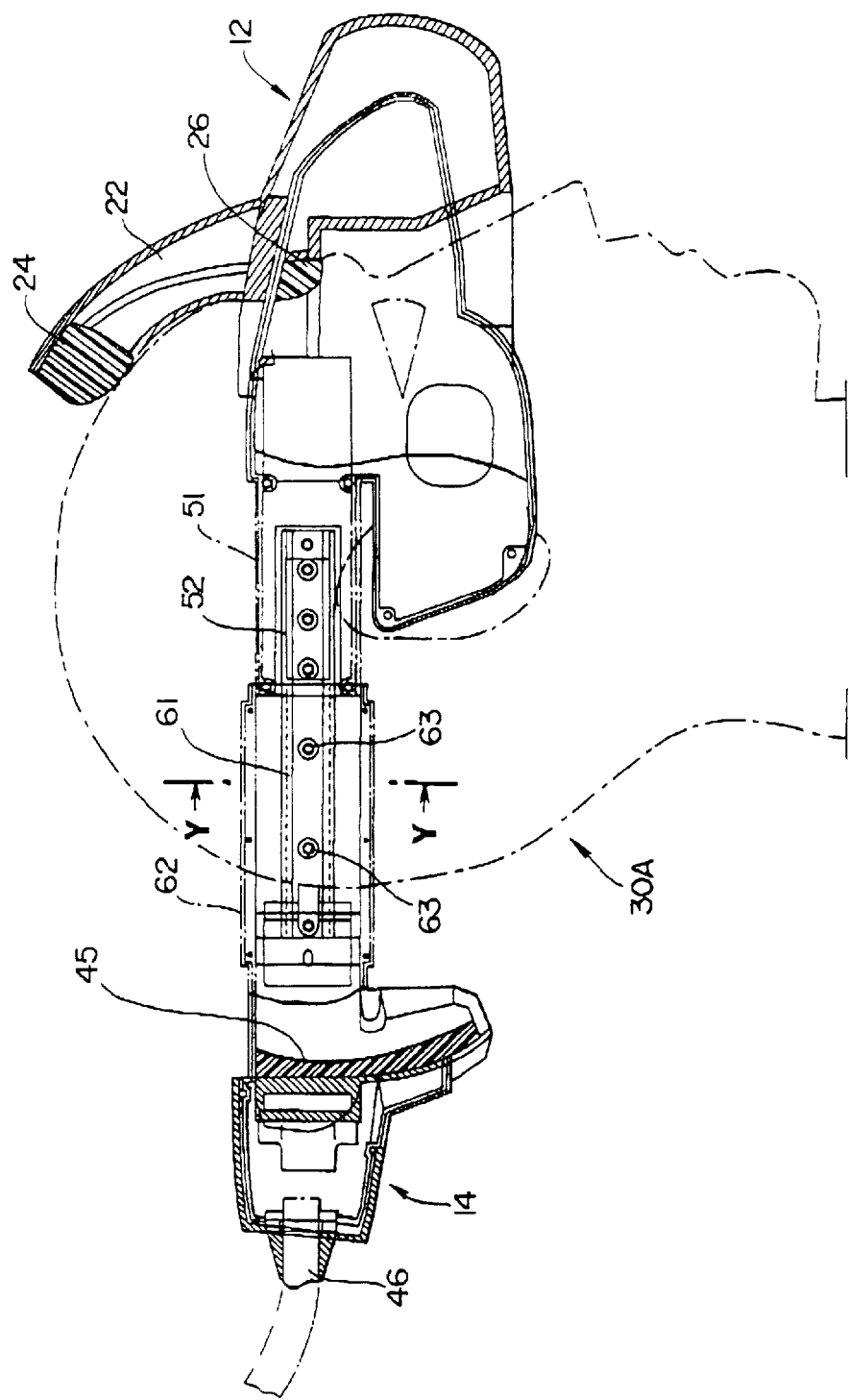
FIG. 3 is a sectional view of the HMD taken through line X—X of FIG. 2.

A cord 46 to be connected to the display device 2 extends from a substantial central portion of the back frame 14. As shown in FIG. 3, this cord 46 is connected to a connecting portion (for example, a connecting portion of a control device for controlling images, etc. projected from the display screen 3) located above the head when the HMD 1 is put on the head. Accordingly, since one end of the cord 46 not attached to the back frame 14 always stays away from the HMD and at a position higher than the head, it is possible to prevent the cord 46 from interrupting the player. Moreover, as the weight of the cord 46 is supported at the connecting portion, it is possible to avoid most of the weight of the cord 46 from being put on the frame.

Also, the end of the cord 46 not attached to the back frame 14 may be connected to a cord adjustment device for winding and unwinding the cord 46 in accordance with tension imposed on the cord 46. For example, this cord adjustment device may be constructed in a manner such that it unwinds the cord 46 according to the tension imposed on it and makes the length of the cord 46 extending from the back frame 14 longer when the player putting the HMD 1 on his/her head moves in a direction away from the device, to which the end of the cord 46 is connected, imposing tension on the cord 46; and it stops unwinding and begins winding the cord 46 when the player's movement stops and the tension is no longer imposed on the cord 46. As described above, by installing the cord adjustment device, the length of the cord 46 extending from the back frame 14 can be adjusted in accordance with the player's movement and, therefore, it is possible to restrain the cord 46 from interrupting the player and from becoming entangled.

The back frame 14 has a construction similar to that of the front frame 12, in which an outer casing 140A can be freely attached to and detached from a body 140B inside of the frame and is secured with screws, etc. to the body 140B in a freely attachable and detachable manner. As for the lateral sides as well, the outer casing may be constructed in a freely attachable and detachable manner.

As shown in FIG. 1, the connecting devices 30A and 30B comprise: first engagement members 50A and 50B secured at both ends of the front frame 12; and second engagement members 60A and 60B secured at both ends of the back frame 14.

Figure 4:
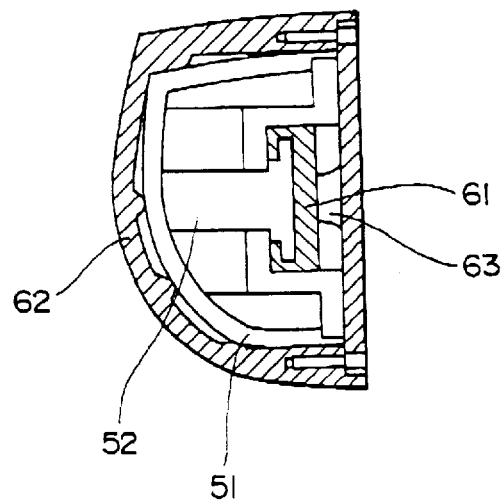
FIG. 4 is a sectional view of the HMD taken through line Y—Y of FIG. 3.

As shown in FIGS. 2 through 4, each of the first engagement members 50A and 50B comprises: a hollow housing 51 the inside surface of which is curved to fit the temporal regions of the head; and a slider 52 which is secured on the inside of the housing 51, which engages with a rail 61 of the respective second engagement members 60A and 60B hereinafter explained in detail), and which moves back and forth along the rail 61 in accordance with the operation of the handle 38.

Each of the second engagement members 60A and 60B comprises: a hollow housing 62 the inside surface of which is curved to fit the temporal regions, and which is of a size large enough to insert the housing 51 inside in a manner freely movable back and forth; and a rail 61 secured with a screw 63 to the inner wall of the housing 62. The rail 61 is provided with its part closer to the front frame 12 extending into the housing 51. The housing 51 is constructed to move back and forth within the housing 62 as the slider 52, which has a constant width, moves along the rail 61. Due to this back-and-forth movement, the length of the connecting devices 30A and 30B is adjustable.

A slot (not shown) larger than the and of the rail 61 is provided at the U-shaped end 12B of the inner wall 12A (FIG. 2) of the front frame 12. When the belts 16A and 16B are fastened and when the front and bark frames move in closer to each other, the rail 61 elastically deforms as it advances into a space 12C of the front frame 12 (s ee the dotted and dashed line in the drawing). Hence the slider 52 moves toward the back frame 14 along the rail 61, thereby enabling a player to put the HMD 1 on the head.

Next, specific movements of th e HMD 1 with a mounting device of the invention are explained hereinafter in detail.

When putting the HMD 1 on the head, the player first pulls the handle 38 of the belt fastening and loosening device 20, and releases the engagement of the engagement portion 40 with t he pocket opened in the middle of the pinion 34. The player extends the belts 16A and 16B to appropriate length to extend t he length of the connecting devices 30A and 30B in order to expand the diameter of the mounting device 10 until it becomes wide enough to easily put the HMD 1 on the head. Next, the HMD 1 is set at an appropriate position of the head, the pad members 18A and 18B are pressed to the temples, the pad member 26 is pressed to the forehead, and the pad member 24 is pressed to the vertex. Then the handle 38 of the belt fastening and loosening device 20 is pushed in so as to engage the engagement portion 40 with the pocket opened in the middle of the pinion 34.

Then, the handle 38 is turned. This turning movement causes the pinion 34 to engage with the racks 32A and 32B, so that the rack 32A moves in the direction of an arrow L in FIG. 5, the rack 32B moves in the direction of an arrow R in FIG. 5, and the length of the belts 16A and 16B is gradually made shorter. As a result, the belts 16A and 16B begin to fasten the temporal regions, and at the same time, the engagement portion 52 moves backward along the rail 61, the housing 51 is inserted into the housing 62, the length of the connecting devices 30A and 30B becomes shorter, the distance between the front frame 12 and the back frame 14 becomes shorter, and the pad member 45 is pressed to the back portion of the head. Further, as the handle 38 is turned, the forehead is fastened by the front frame 12, the back portion of the head is fastened by the back frame 14, and the temporal regions are fastened by the belts 16A and 16B.

As described above, the mounting device 10 makes it possible to fasten the front, back and temporal regions of the head with certainty. Therefore, even if the head is moved fiercely, the HMD 1 never slips off the head. Moreover, since the pad members 18A and 18B are pressed to the temples, the pad member 26 to the forehead, the pad material 45 to the back portion of the head, and the pad member 24 to the vertex, superior comfort can be obtained.

After it is confirmed that the HMD 1 does not slip off by fierce movement of the head, the player stops turning the handle 38. Since the belt fastening and loosening device 20 is provided at a position where the player can easily operate it (the position offset to the right from the center of the back frame 14), the HMD 1 can be put on the head even more easily.

On the other hand, in order to take the HMD 1 off the head, the player pulls the handle 38 and releases the engagement of the engagement portion 40 with the pocket opened in the middle of the pinion 34 to make the pinion 34 free. This causes the racks 32A and 32B to move in the direction opposite to the aforementioned direction, thereby loosening the belts 16A and 16B and extending the length of the connecting devices 30A and 30B, thereby expanding the diameter of the mounting device 10.

Incidentally, in Example 1, a means for easily loosening the fastened belts 16A and 16B by releasing the engagement of the engagement portion 40 with the pocket opened in the pinion 34 is provided in the belt fastening and loosening device 20. However, without limitation to the above means, a loosening means for loosening the fastened belts 16A and 16B by turning the handle 38 in the counterclockwise direction may be provided.

In Example 1, the connecting devices 30A and 30B which consist of the first engagement members 50A and 50B and the second engagement members 60A and 60B is explained above. However, without limitation to the above, any type of belt fastening and loosening device of the invention is acceptable as long as it has a construction which enables connection of the front frame and the back frame in a manner which allows free movement toward the back and front of the head.

Further, in Example 1, an explanation is given about the belt fastening and loosening device 20 comprising the pinion 34 which engages with the racks 32A and 32B mounted at both ends of the belts 16A and 16B. However, without limitation to the above, any type of belt fastening and loosening device 20 of the invention is acceptable as long as it has a construction which enables the adjustment of the length of the belts 16A and 16B in order to fasten the belts 16A and 16B.

Furthermore, in Example 1, an explanation is given about the use of securing members such as screws for the attachment and detachment of the body 120B of the front frame 12 to and from the outer portion 120A of the front frame 12, and for the attachment and detachment of the body 140B of the back frame 14 to and from the outer portion 140B of the back frame 14.

However, without limitation to the above, other methods may be adopted, for example, a method of securing the body 120A of the front frame 12 (or the body 140B of the back frame 14) and the cuter portion 120A of the front frame 12 (or the outer portion 140A of the back frame 14) in a freely attachable and detachable manner by providing engagement portions on both the body and the outer portion to engage with each other and by making them engage with each other. Also, it is not necessary to separate the frame into the body part and the outer portion of the frame.

In the HMD 1 of the invention, the display device 2 Is supported by the rigid front frame 12 and is secured on the head by the front frame 12, the back frame 14. and the belts 16A and 16B. Namely, only by fastening the belts 16A and 16B, both the frames 12 an d 14 can be secured at the forehead and back portion of the head with certainty, and at the same time, the belts 16A and 16B can be secured at the temporal regions. As a result, even if the head has to be moved fiercely, it is possible to prevent the HMD 1 from slipping off the head and to enhance comfort while wearing the HMD 1 on the head.

As either the first engagement members 50A and 50B or the second engagement members 60A and 60B comprise a rail 61, and the other engagement members comprise a slider 52 which moves in engagement with the rail 61, not only the above-described working and effect can be obtained, but also the structure of both the engagement members can be simplified and both the frame 12 and 14 can be moved smoothly.

Moreover, as the racks 32A and 32B are provided at the ends of the belts 16A and 16B, and the pinion 34 to engage with the racks 32A and 32B is provided in the belt fastening and loosening device 20, the front, back, and temporal regions of the head can be fastened more easily, Also, by providing the pad members 18A and 18B which can be pressed to the temples, it is possible to prevent the HMD 1 from slipping off in the horizontal direction and to further enhance the comfort while wearing the HMD 1 on the head.

Furthermore, by providing the pad member 24 which can be pressed to the vertex, it is possible to prevent the HMD 1 from slipping off in the vertical direction and to further enhance the comfort while wearing the HMD 1 on the head.

Also, as the cord 46 to be connected to the display device 2 is extended from the center of the back frame 14, it is possible to further enhance the balance of the HMD 1 at the front, back, right, and left sides, and to enhance the comfort while wearing the HMD 1 on the head.

As the end of the cord 46 is positioned above the head, it is possible to play a game more comfortably. Moreover, by placing the belt fastening and loosening device 20 at a position offset from the center of the back frame 14, the player can operate the device more easily and it is also possible to prevent the cord 46 and the belt fastening and loosening device 20 from interfering with each other.

Further, as the other end of the cord 46 not attached to the back frame 14 is connected to the cord adjustment device, it is possible to restrain the cord 46 from interrupting the player's movements and from getting entangled.

Further more, by providing a UV cut filter on the front face of the display screen 3, it is possible to lighten the load on th e eyes. Placement of the display device 2 and the speakers 4 at positions where they do not touch the player directly, makes the HMD 1 superior in respect to sanitation.

As the outer casing 140A is constructed to be freely attachable to and detachable from t he body 140B, the outer casing 140A can be easily replaced as desired. Therefore, model changes can be performed easily.

EXAMPLE 2

Example 2 of this invention is hereinafter explained with reference to FIGS. 7 through 30. The same members as those used in Example 1 are given the same numerals, and explanations of such members are sometimes omitted.

Figure 7:
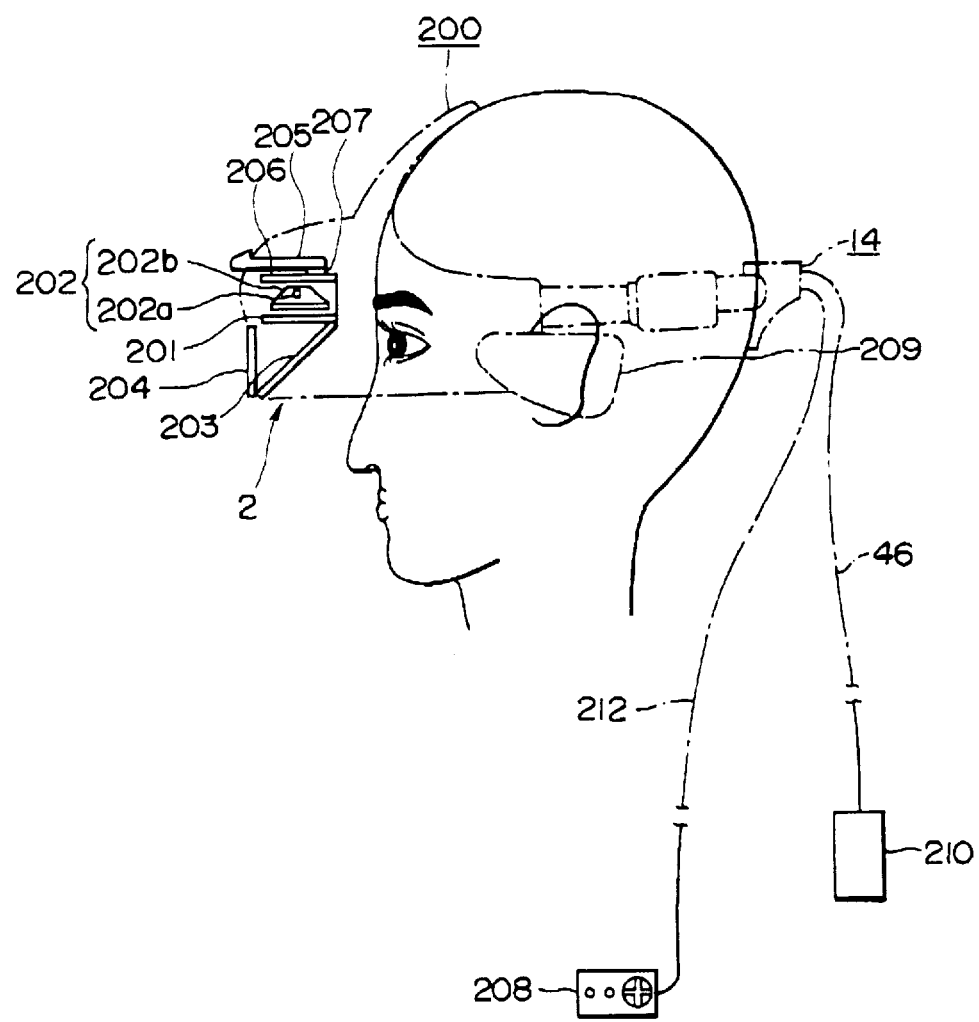
FIG. 7 is a schematic view of the HMD of Example 2 of this invention.
Figure 8:
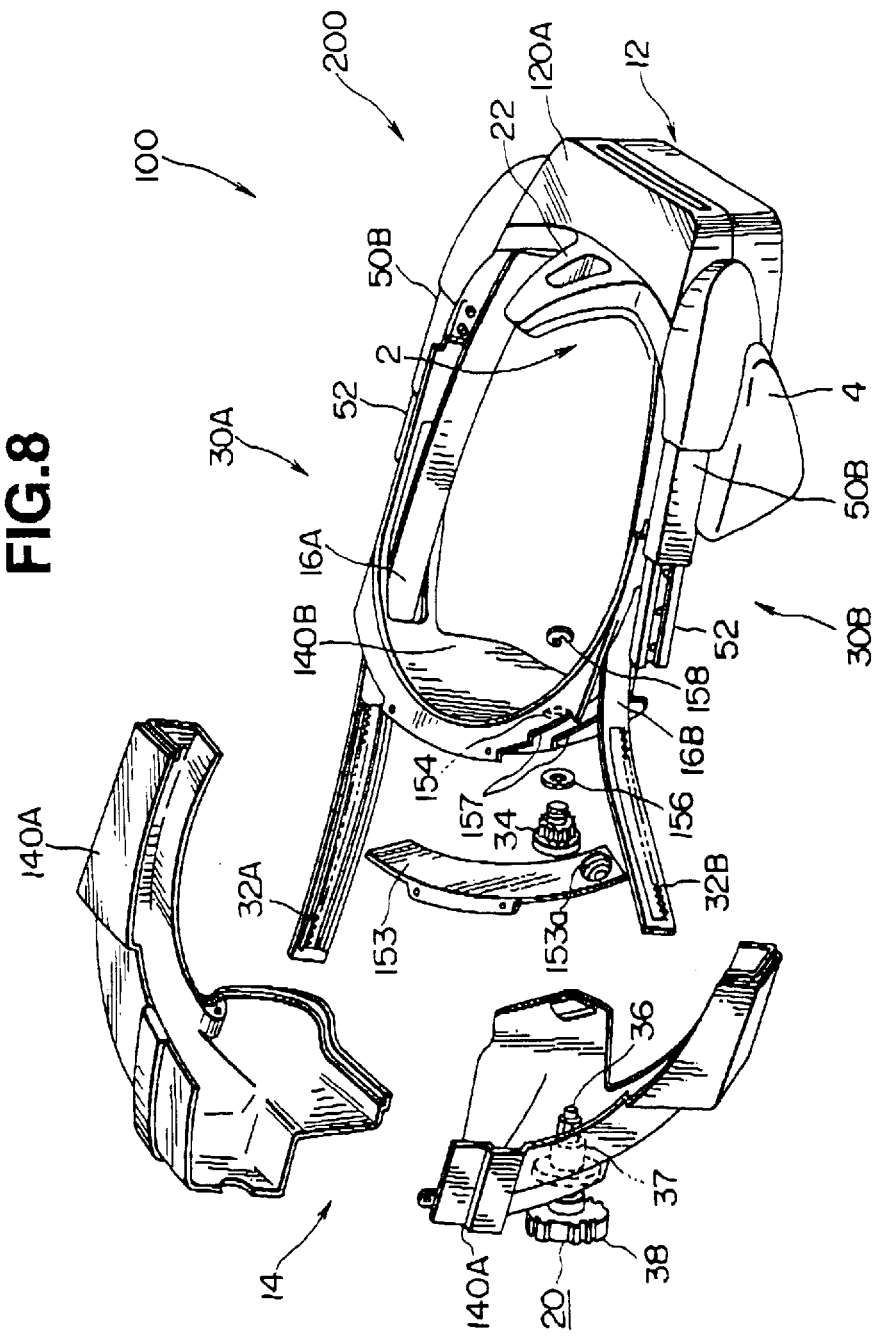
FIG. 8 is an exploded perspective view of the HMD shown in FIG. 7.

HMD 100 shown in FIGS. 7 and 8 is constructed by comprising the same display device 2 as that used in Example 1 and a mounting device 100 for mounting and supporting the display device 2 on the head.

The mounting device 100 comprises: a front frame which is capable of surrounding the forehead and of covering both eyes and both ears of a player when the HMD Is put on the head, the inside surface of which in curved to fit the shape of the forehead, and which is shaped like a substantial half ring which is hollow; a back frame 14 as explained in Example 1; and connecting devices 30A and 30B, which are placed at both ends of the front frame 200 and the back frame 14, for connecting the front frame 200 and the back frame 14 in a manner freely movable toward the back and front of the head As shown in FIGS. 7 and 8, the front frame 200 of Example 2 is different from the front frame 12 of Example 1 in that a software cartridge 205 for games, etc. can be inserted into an upper front position of the front frame 200. Namely, a drive circuit substrate 206 is placed at the upper front position of the front frame 200, and a connector 207 is fixed and adhered to the rear center of the drive circuit substrate 206. The front frame 200 has a construction capable of mounting the software cartridge 205 by inserting it from the front to the connector 207.

On the drive circuit substrate 206, a drive circuit of a liquid-crystal display panel 201, which is a component of the display device 2, and a computer circuit are provided. This computer circuit reads in software from the software cartridge 205 and performs information processing in response to operation signals sent from a controller 208 by the player. Images are projected from the liquid-crystal display panel 201 through the drive circuit of the liquid-crystal display panel 201, and sound signals are transmitted to speakers 4. Accordingly, the player can play a game by operating the controller 20 while watching the images projected from the liquid-crystal display panel 201.

In Example 2, the display device 2 also used in Example 1 is explained in further detail.

The display device 2, as shown in FIG. 7, comprises the liquid-crystal display panels 201 which are placed almost horizontally at positions opposed to each player's eyes. Above these liquid-crystal display panels 201, a lighting device 202a such as a fluorescent light, and a backlight device 202 including a reflecting mirror 202b are placed. This backlight device 202 throws light equally on the liquid-crystal display panels 201 from its back side, thereby forming bright images.

As the display device 2, for example, small-sized cathode-ray tubes may be used. If the cathode-ray tubes are used, the above-mentioned backlight device 202 does not have to be used.

Beneath the projected plans of the liquid-crystal display panels 201, partially-reflective mirrors 203 are placed, which cover the projected plane inclined from the upper position closer to the eyes to the lower position away from the eyes. Moreover, at the front of the partially-reflective mirrors 203, that is, at the position in the player's horizontal visual field, other partially-reflective mirrors 204 are erected. In this construction, the images projected from the liquid-crystal display panels 201 are reflected by the partially-reflective mirrors 203 toward the partially-reflective mirrors 204, such reflected images are further reflected by the partially-reflective mirrors 204, and the player watches the reflected images through the partially-reflective mirror 203.

In the display device 2 having the above-described construction, external light penetrates through the partially-reflective mirrors 204 and reaches the player. Therefore, the player can see the outside at the same time he/she watches the images on the liquid-crystal display panels 201. Also, instead of the partially-reflective mirrors 204, mirrors which do not function as partially-reflective mirrors and which, for example, only have a reflection function without light permeability, may be used. In such a case, only the picture displayed on the liquid-crystal display panels 201 will be provided to the player.

In Example 2 the construction and installation of the belts 16A and 16B also used in Example 1 are explained in further detail.

As shown in FIGS. 14 through 19, the belts 16A and 16B respectively have narrow, rectangular-shaped openings 530A and 530B in which the pinion 34 is to b e placed The rack 32A to engage with the pinion 34 is formed in the lengthwise direction at the upper edge of the opening 530A. On the other hand, the rack 32B to engage with the pinion 34 is formed in the lengthwise direction at the lower edge of the opening 530B. Moreover, a projection 530 for the sliding purpose is provided along the edge of the openings 530A and 530B and on the respective surfaces where both the belts 16A and 16B contact with each other. Ribs 540 for the sliding purpose are provided at the positions along the upper and lower edges of the belt 16A, specifically In the lengthwise direction of the belt 16A on its surface where it contacts with the belt 16B. Incidentally, Numeral 550 is a pocket into which a shaft for mounting the belts 16A and 16B to be hinged at the front frame 200, is inserted.

The belts are assembled with the back frame 14 in the following way. First, the belts 16A and 16B are overlapped over one another and inserted Into the body 140B of the back frame 140. Then the belts 16A and 16B are set to place the pinion 34 between the racks 32A and 32B so that the pinion 34 engages with the dentition of the racks 32A and 32B. This pinion 34 is set in a freely rotatable manner at the body 140B. Next, a support plate 153 for supporting the belts 16A and 16B is mounted at desirable intervals from the body 140B and over the belts 16A and 16B, which are assembled with the body 140B. Namely, the support plate 153 is assembled with the body 140B so as to fill up a space between two opposite brims 157 shown in FIG. 8. On the support plate 153, a dent 153a to accommodate a flange 544 of the pinion 34, and a pocket 153b opened at the bottom of the dent 153a are formed. The support plate 153 is anchored at the body 140B by placing the flange 544 of the pinion 34 in the dent 153a, thereby retaining the pinion 34 at the body 140B with stability.

Next, the outer casing 140A is assembled with the body 140B. This enables the engagement portion 40 of the shaft 36 of the belt fastening and loosening device 20 to be inserted into the shaft pocket 34a of the pinion 34 through the pocket 153a opened in the support plate 153. Note that the cylindrical portion 534 for guidance is mounted on the tip of the engagement portion 40 of the shaft 36.

The belt fastening and loosening device 20 used in Example 1 is hereinafter explained with reference to FIGS. 9–13, and 20–30.

The tip or the pinion 34 is made narrower in diameter because the diameter of the pinion 34 changes at an edge 43a. The pinion 34 comprises: a mounting shaft 43 to be inserted into a mounting hole 154 opened in the body 140B;

a corrugated portion 542 in continuation to the mounting shaft 43; a flange 544 with a protruding edge 544a, which is beat and curved in continuation to the corrugated portion 542 and which protrudes toward the corrugated portion 542 and contacts with the belt 16B; and a shaft pocket 34a opened from the flange 544 toward the mounting s haft 43. This shaft pocket 34a has a hexagonal pocket portion 541a, a circular pocket portion 541a at its entrance, and a circular pocket portion 541c at its inner end in which the tip of the shaft 36 is placed.

The corrugated portion 542 of the pinion 34 is inserted between the rack 32A of the belt 16A and the rack 32B of the belt 16B so that it engages with these racks 32A and 32B. With the edge 43a in contact with a washer 156, an E ring 158 is plugged in a circular groove 545 on the mounting shaft 43 projecting through the mounting hole 154, thereby assembling the pinion 34 with the body 140B in a freely rotatable manner.

Figure 23:
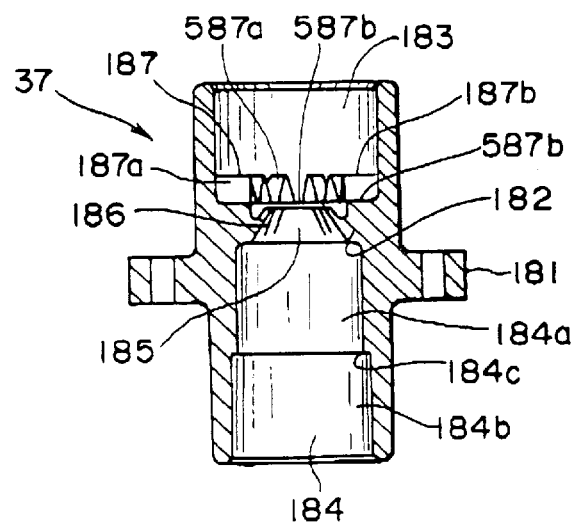
Figure 24:
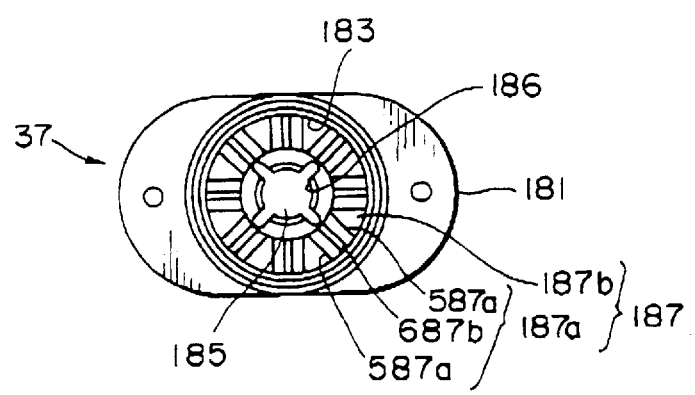
FIG. 24 is a plan view of the belt fastening and loosening device shown in FIG. 23.
Figure 25:
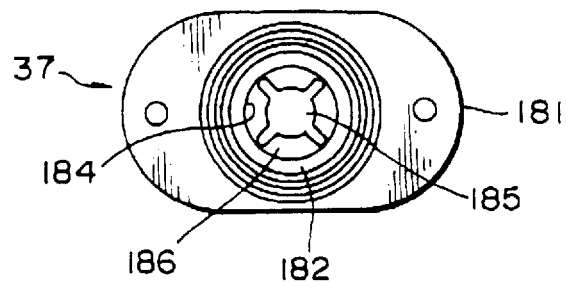
FIG. 25 is a bottom view of the belt fastening and loosening device shown in FIG. 23.
Figure 26:
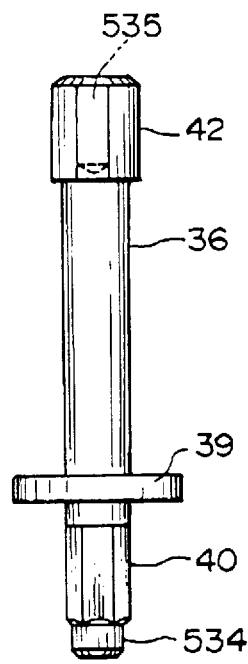
FIG. 26 is a front view of the shaft of the belt fastening and loosening device.
Figure 27:
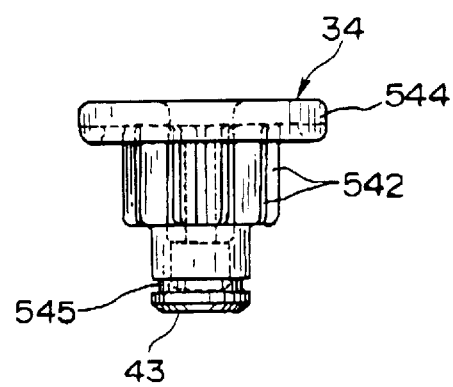
FIG. 27 is a front view of the pinion of the belt fastening and loosening device.
Figure 28:
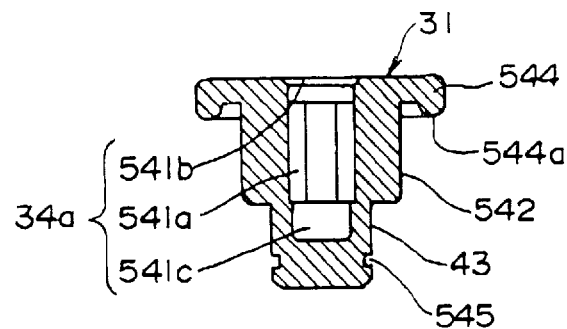
FIG. 28 is a sectional view of the pinion shown in FIG. 27.
Figure 29:
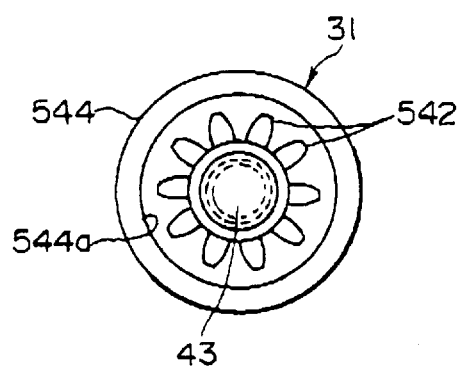
FIG. 29 is a bottom view of the pinion shown in FIG. 27.
Figure 30:
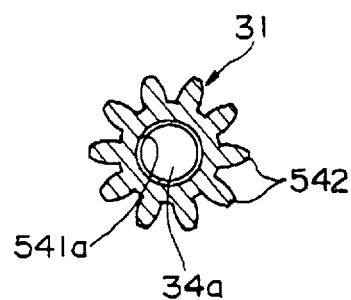
FIG. 30 is a horizontal section view of the corrugated portion shown in FIG. 27.

As shown in FIG. 23, the housing 37 has a flange 181, at an almost middle position on the outside surface, for assembling the housing 37 with the back frame 14. This housing 37 has a pocket 183, on one side of a partition wall 182 in to which the shaft 36 is to be inserted, for accommodating a boss 11 of the handle 38. on the other side of the partition Wall 182 of the housing 37, another packet 184 with a different diameter from that of the pocket 183 is formed. This pocket 184 has a construction in which a pocket 184a with a shorter diameter and a pocket 184b with a longer diameter lie in a row to form one pocket. At the boundary between the pockets 184a and 184b an edge 184c is formed. The partition wall 182. which corresponds to the bottom of the packet 183, has a hole 185 in the middle, through which the shaft 36 is inserted, so that the pocket 183 communicates with tehe pocket 184. Elastic pieces 186 are provided a t the hole 185 by making the end of the elastic pieces 186 on the pocket 183 side form a smaller circle than the hole 185. An engagement portion 187 is provided along the periphery of the pocket 185 over the partition wall 182 on the side of the pocket 183. Th e engagement portion 187 has wedge-shaped engagement grooves 187a radiating in all directions along the periphery of the hole 185 of the partition wall 182. The engagement grooves 187a have wedged-shaped inclined planes 587a and tip-of-wedge portions 587b. Spaces between the engagement grooves 187a are flat planes 187b.

The handle 38 comprises a grip portion 514 and a boss portion 11. The handle 38 has a pocket which penetrates through the grip portion 514 and the boss portion 11, and a part of the packet in the boss portion is a hexagonal mounting pocket 512 in which a hexagonal nut 42 of the shaft 36 is to be inserted. The handle 38 also has a pocket 515 in which a screw to be inserted into the mounting pocket 512 is put. A screw 44 can be inserted through the pocket 515 from the side of the grip portion 514 into a screw pocket of the hexagonal nut 42 or the shaft 36 inserted in the mounting pocket 512. A ring-shaped protruding edge 517, which forms a ring-shaped groove 561, is provided around the periphery of the boss portion 11, and the end of the housing 37 can be placed in such ring-shaped groove 561 with stability.

Moreover, engagement portions 518 are provided at the end of the boss portion 11 along the periphery of the mounting pocket 512 in the circumferential direction. These engagement portions 518 are provided with mountain-shaped engagement projections radiating in all directions along the periphery of the boss portion 11 so that they engage with the engagement grooves 187a, that is, the engagement portion 187, of the housing 37. Each of the engagement projections 518a is composed of a top end plane 618a and inclined planes 618b on both sides of the top end plane. Spaces between the engagement projections 518a are formed as flat planes 518b.

Figure 9:
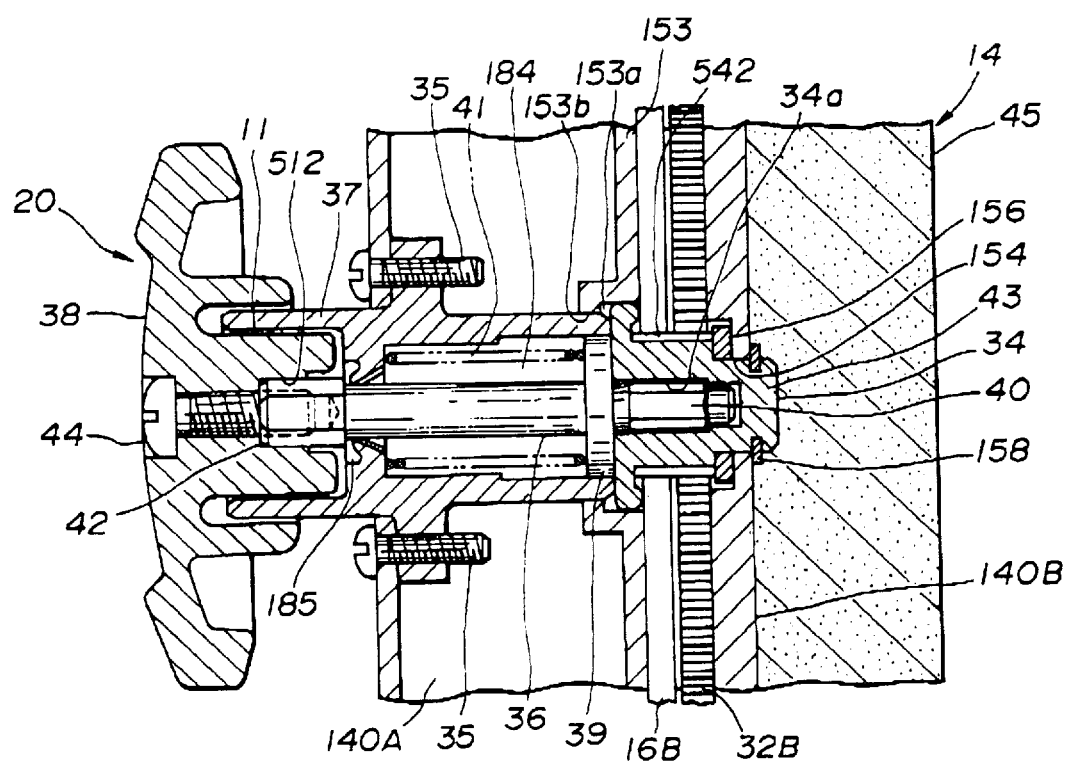
FIG. 9 is a sectional view of a belt fastening and loosening device of the HMD shown in FIG. 7 taken in the horizontal direction, which shows the shaft engaged with the pinion.
Figure 11:
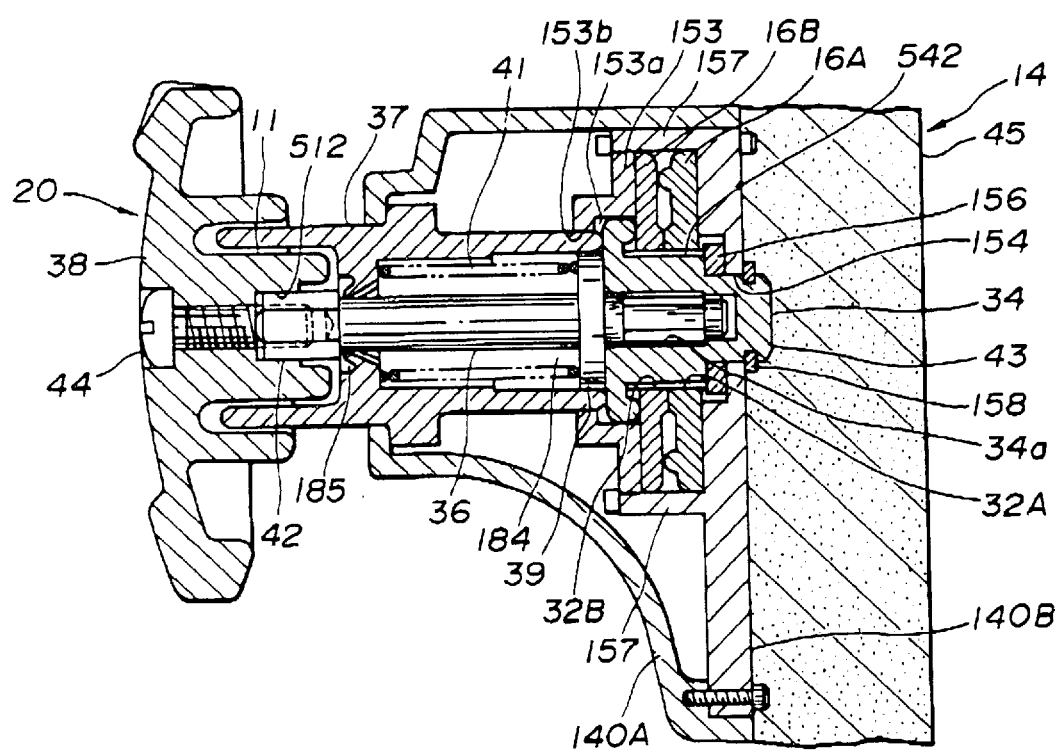
FIG. 11 is a sectional view of the belt fastening and loosening device of the HMD shown in FIG. 7 taken in the vertical direction, which shows the shaft engaged with the pinion.

As shown in FIGS. 9 and 11, the belt fastening and loosening device 20 is usually in the engagement state, that is, the pinion 34 is engaged with the shaft 36. Namely, as the hexagonal nut 42 of the shaft 36 stays in the shaft pocket 34a or the pinion 34 by the force of the coil spring 41, the shaft 36 and the pinion 34 are in the state of engagement.

In this state of engagement, the engagement portion 518 of the handle 38 engages with the engagement portion 187 of the housing 37. In other words, the mountain-shaped engagement projections 518a of the engagement portion 518 fit in the V-shaped engagement grooves 187a of the engagement portion 187. As a result, unless the handle 38 is turned, the pinion 34 does not rotate and the belts 16A and 16B in engagement with the pinion 34 stay in the stop position.

When the handle 38 is turned in the state of engagement, the engagement projections 518a in engagement with the engagement grooves 187a move up, being guided by the inclined planes 618a and 587a, against the force of the coil spring 41, and the engagement projections 518a are successively or continuously released from engagement with the engagement grooves 187a, thereby enabling the pinion 34 to rotate in either a clockwise or counterclockwise direction. Accordingly, in Example 2, by turning the handle 38 clockwise, the belts 16A and 16B can be moved to the directions to fasten them. in other words, the back frame 14 can be moved toward the front frame 200 in the direction to make the space formed by the front frame 200 and the back frame 14 smaller. On the other hand, by turning the handle 38 counterclockwise, the belts 16A and 16B can be moved to the directions to loosen them in other words, the back frame 14 can be moved away from the front frame 200 in the direction to make the space formed by the front frame 200 and the back frame 14 larger.

If the turning of the handle 38 is stopped, the engagement projections 518a of the engagement portion 518 fall in the engagement grooves 187a of the engagement portion 187 by the for ce of the coil spring 41. As a result, the engagement portions 518 and 187 enter into a state of engagement, and the belts 16A and 16B are blocked so that they cannot move in either direction.

Figure 10:
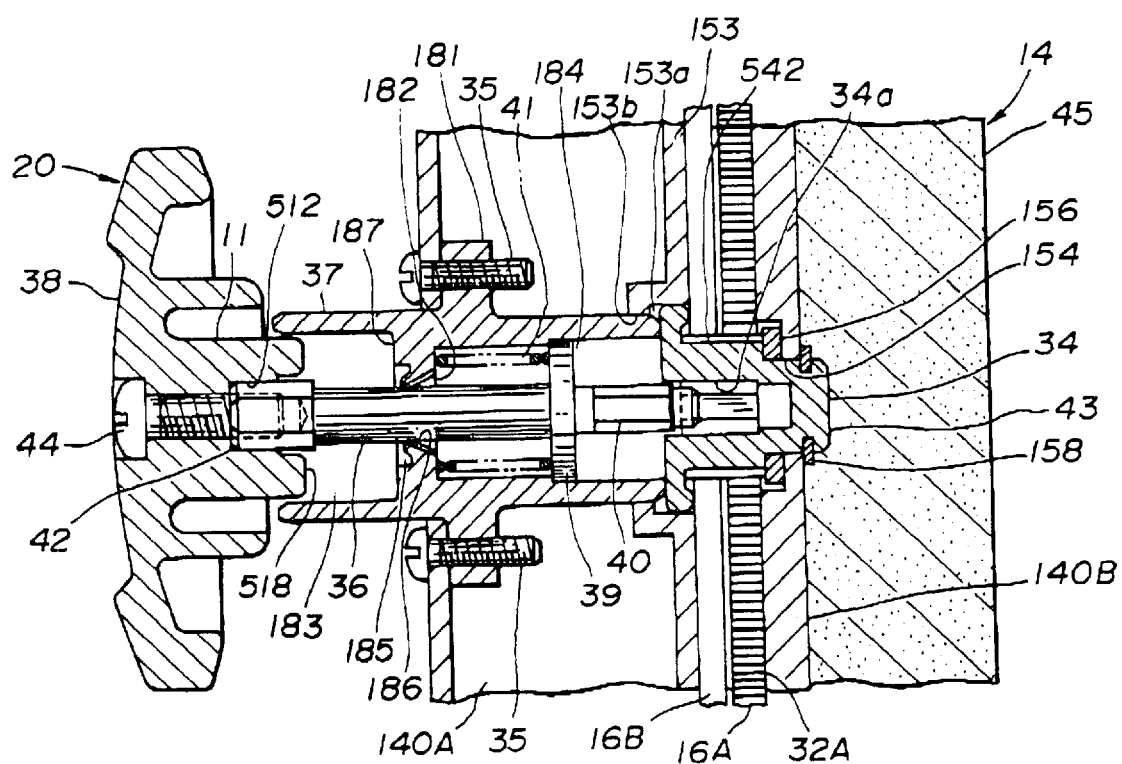
FIG. 10 is a sectional view of the belt fastening and loosening device of the HMD shown in FIG. 7 taken in the horizontal direction, which shows the shaft pulled out of the pinion in the state of released engagement.
Figure 12:
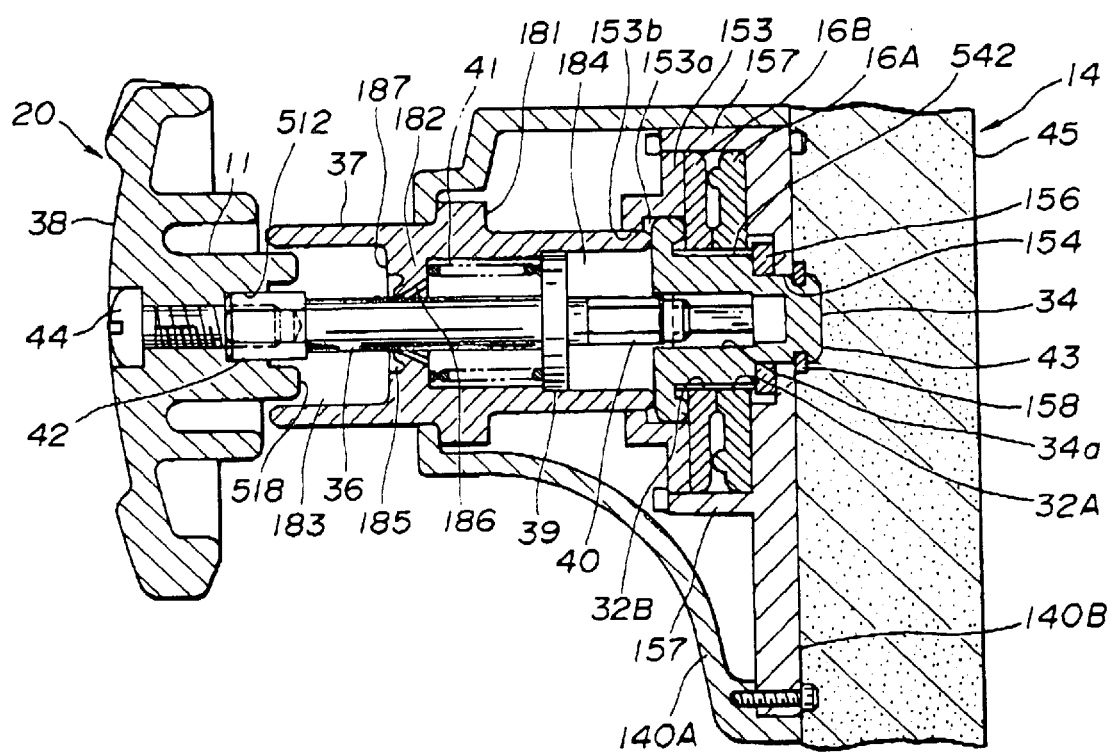
FIG. 12 is a sectional view of the belt fastening and loosening device of the HMD shown in FIG. 7 taken in the vertical direction, which shows the shaft pulled out of the pinion in the state of released engagement.
Figure 13:
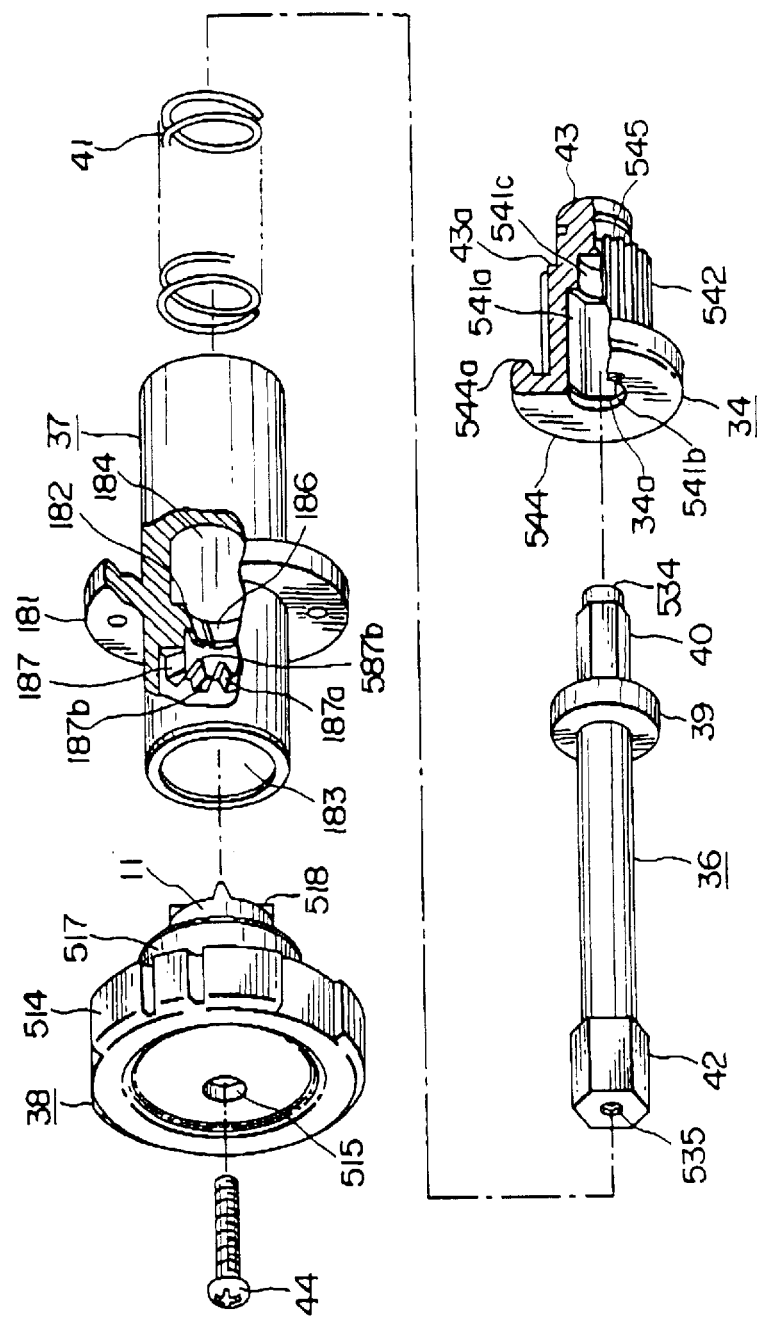
FIG. 13 is a diagram showing the assembly structure of the belt fastening and loosening device.
Figure 14:
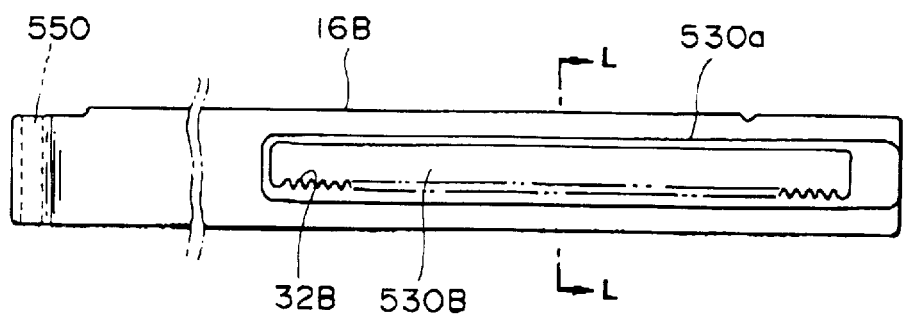
FIG. 14 is a side view of one of the belts.
Figure 15:
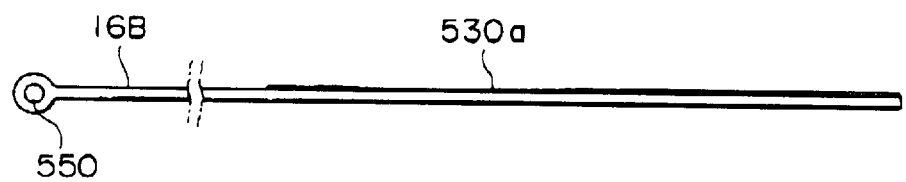
FIG. 15 is a plan view of the belt shown in FIG. 14.
Figure 16:
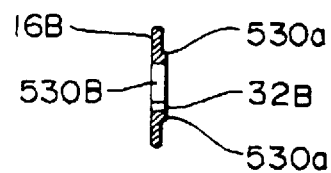
FIG. 16 is a sectional view of the belt taken through line L—L of FIG. 14.
Figure 17:
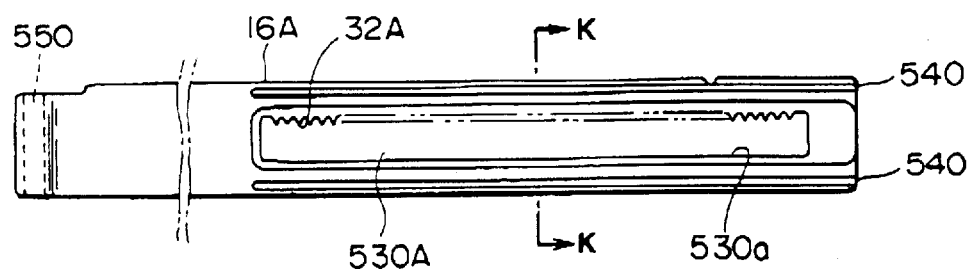
FIG. 17 is a side view of the other belt.
Figure 18:
FIG. 18 is a plan view of the belt shown in FIG. 17.
Figure 19:
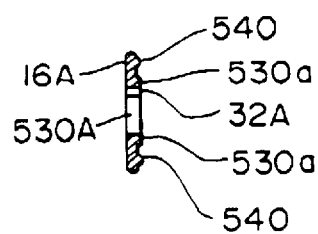
FIG. 19 is a sectional view of the belt taken through line K—K of FIG. 17.
Figure 20:
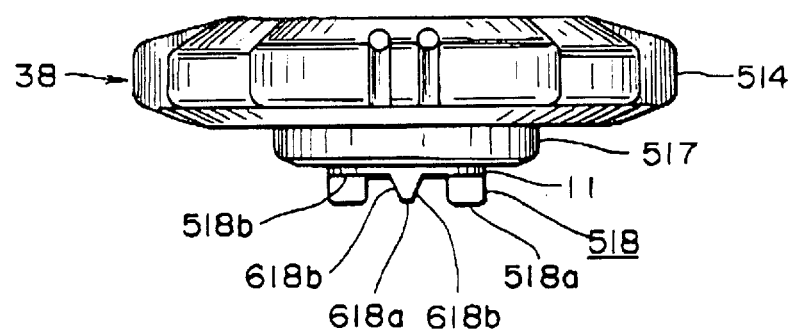
FIG. 20 is a side view of a part of the belt fastening and loosening device.
Figure 21:
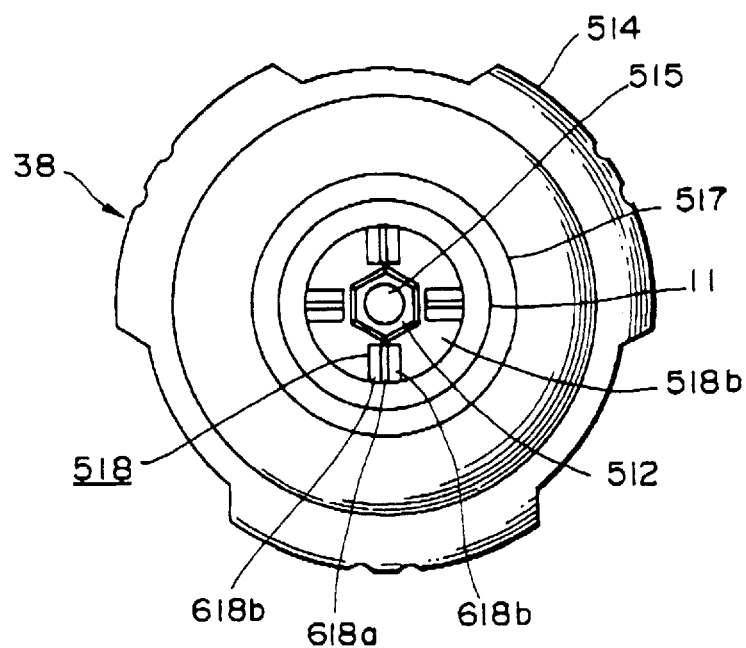
FIG. 21 is a plan view of the belt fastening and loosening device.
Figure 22:
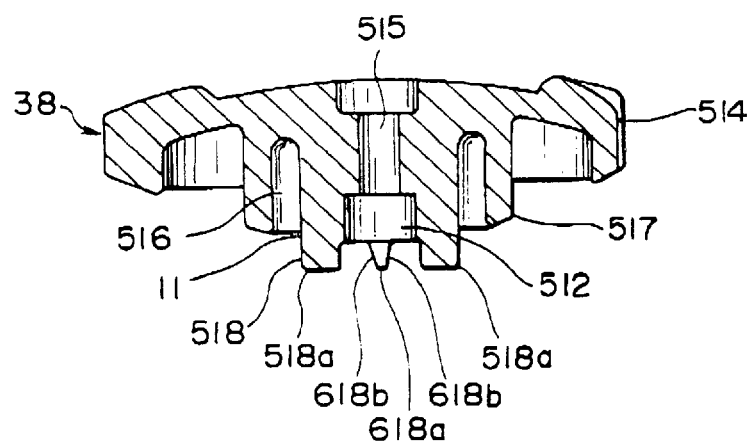
FIGS. 22 and 23 are partial sectional views of the belt fastening and loosening device.

As shown in FIGS. 10 and 12, when the belt fastening and loosening device 20 is pulled against the biasing force of the coil spring 41, the engagement portion 40 of the shaft 36 is released from the engagement with the hexagonal pocket portion 541a of the shaft pocket 34a of the pinion 34 and then the pinion 34 is made freely rotatable. Accordingly, if the belts 16A and 16B are biased toward the directions to be moved away from each other, or if the front frame 200 and the back frame 14 are biased toward the directions to be moved away from each other (for example, by placing a member such as a plate spring at the connection positions between the front frame 200 and the back frame 14 to bids these frames in the directions that they move away from each other) in the above-described state of loosened engagement, the front frame 200 and the back frame 14 automatically and instantly begin to move away from each other at the same time as their engagement is released, thereby enabling the player to take the HMD 100 off her head.

Even if any such biasing means is not provided, releasing of the engagement between the shaft 36 and the pinion 34 makes it possible, for example, to move the back frame 14 away from the front frame 200 without turning the handle 38 all the times, thereby enabling the player to take the HMD 100 off the head smoothly and easily.

Moreover, when the pulling force imposed on the handle 38, which is being moved in the pulling-out direction, is released, the force of the coil spring 41 is again imposed on the belt fastening and loosening device 20. As a result, as the cylindrical portion 534 at the tip of the shaft 36 is guided in the circular pocket portion 541b of the pinion 34. the engagement portion 40 of the shaft 36 is introduced in the shaft pocket 34a of the pinion 34. As the shaft 36 is put in the state of engagement with the hexagonal pocket portion 541a of the shaft pocket 34a the belts 16A and 16B keep the state stopped by the pinion 34.

Figure 31:
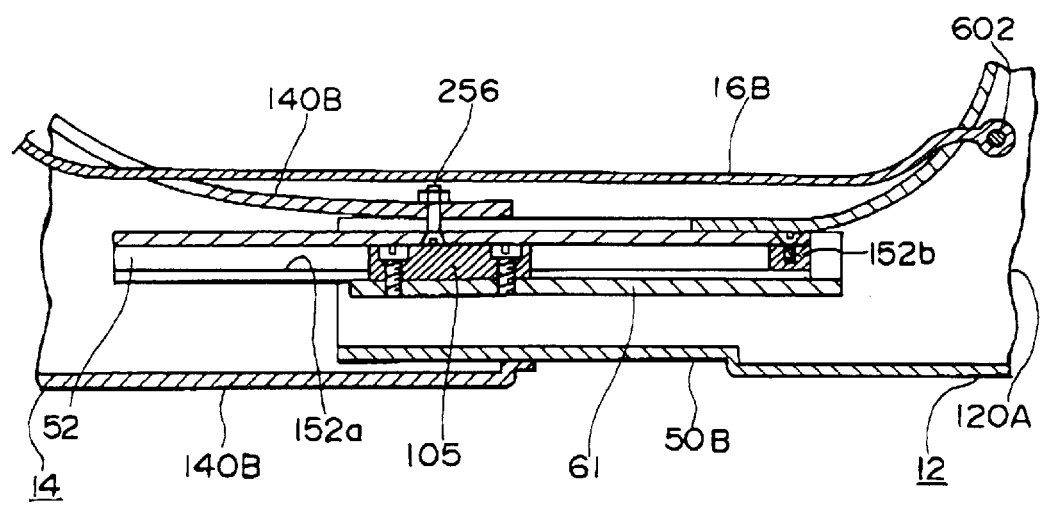
FIG. 31 is a sectional view of a connecting device of another example.
Figure 32:
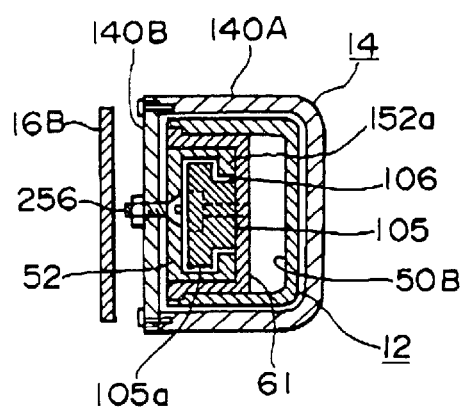
FIG. 32 is a vertical sectional view of the connecting device shown in FIG. 31.

Incidentally. the connecting devices 30A and 30B explained in Examples 1 and 2 may have a construction, for example, shown in FIGS. 31 and 32.

Namely, a supporting member 105 which also serves as a stopper member is secured by screws 105b at both ends Of the back frame 14. This supporting member has protruding edges 105a which protrude upwards and downwards. The slider 152 is set in a slidable manner in a gap 106 formed by the supporting member 105, the back frame 14, and the rail 61.

The slider 152 is open on the side of the back frame 14. The slider 152 has protruding edges 152a which protrude and bend inwardly so that the respective edges are opposed and positioned closer to each other, and the protruding edges 152a engage with the protruding edges 105a of the supporting element 105. A stopper member 152b is secured at the inner end of the slider 152, thereby preventing the belts from being pulled out beyond the position where the stopper member 152b makes contact with th e supporting member 105.

The back frame 14 is secured with a securing member, such as a bolt and a nut, at the slider 152 having the above-described construction.

Moreover, the belts 16A and 16B may be attached to the front frame 12 at the position set at the front frame 12 by using a shaft 602 as shown in FIG. 31 in a hinged manner.

As shown in FIG. 7, the invention of Example 2 is constructed in a manner such that a battery box 210, a separate equipment to be attached to the HMD, is connected to the cord 46 so that electric power is supplied through the back frame 14 to the display device 2. A controller 208 is also connected to the display device 2 through a cord 212.

The battery box 210 may be built in the front frame or the back frame. Of course, a domestic or commercial electric source may be used without using the battery box 210.

EXAMPLE 3

Example 3 of the present invention is hereinafter explained with reference to the drawings.

Figure 33:
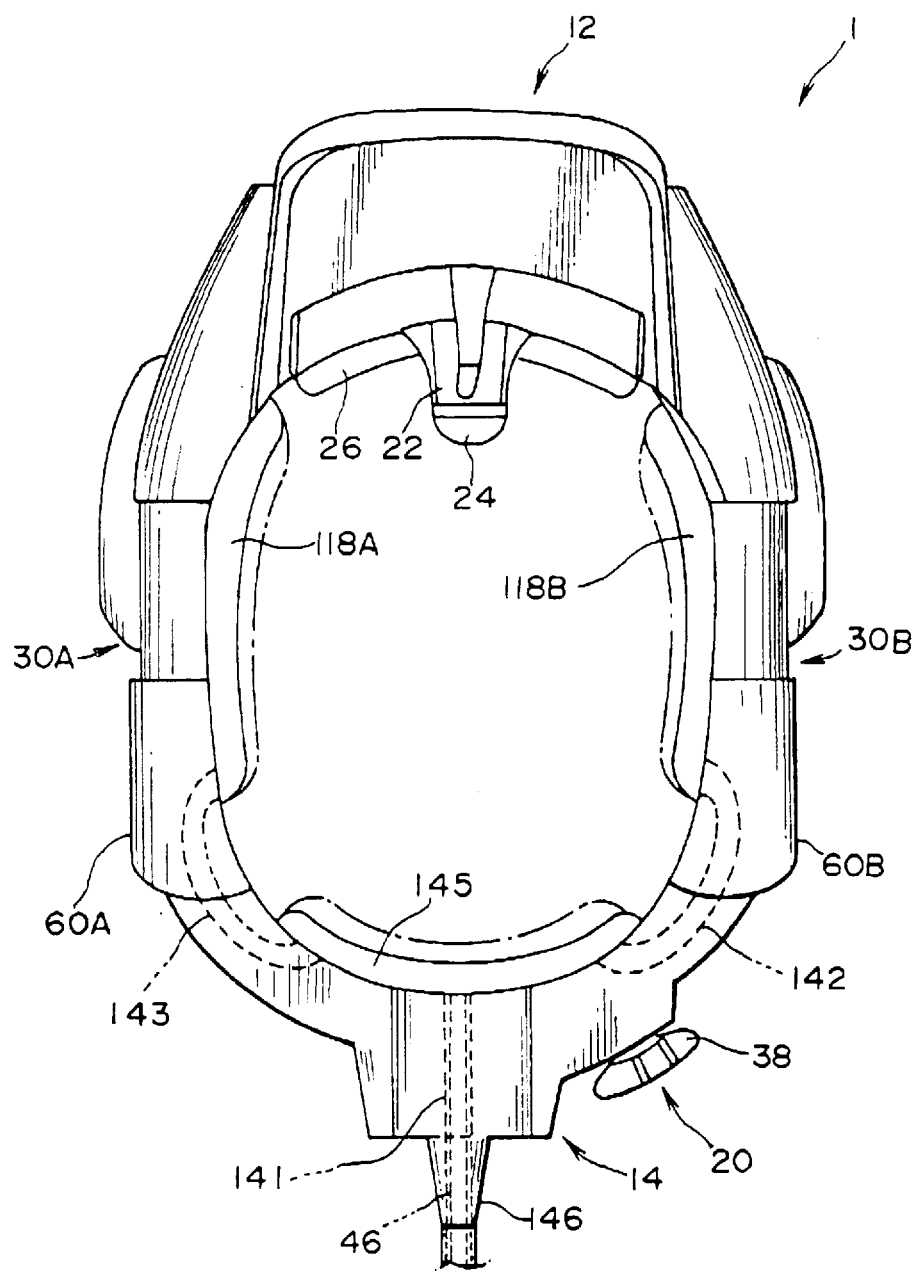
FIG. 33 is a plan view of the HMD of Example 3 of the invention.

FIG. 33 is a plan view of the HMD according to Example 3 of the invention. The same members as those used in Example 1 are given the same numerals, and explanations of such members are sometimes omitted.

As shown in FIG. 33, the HMD 1 of Example 3 is different from the HMD of Example 1 in that an air bag 145 instead of the pad member 45 is placed at the position of the back frame 14 corresponding to the back portion of the head, and air bags 118A and 118B, instead of the pad members 18A and 18B, are placed over the areas covering the positions from the front frame 12, which correspond to the temporal region of the head, to the positions of the back frame 14, which correspond to the temporal regions of the head.

The air bag 145 can be expanded and contracted within the range shown with the full line and dotted and dashed line in FIG. 33 depending upon the amount of air to be contained in the air bag 145. Connected to the air bag 145 is a supply and exhaust pipe 141 for supplying and exhausting air into and from the air bag 145. The supply and exhaust pipe 141 and the cord 46 are contained in the same outer pipe 146 (both are united). The end of the supply and exhaust pipe is connected to a compressor (not shown) which is the source for supplying and exhausting air into and from the air bag 145.

Also, connected to both ends of the air bag 145 are supply and exhaust pipes 142 and 143 which respectively connect with the air bags 118A and 118B. Namely, the air bags 145, 118A, and 118B are connected together in a line via the air supply and exhaust pipes 142 and 143. The air bags 118A and 118B can also be expanded and contracted, as shown with the full lines and dotted and dashed lines in FIG. 33, depending upon the amount of the air to be contained in the air bags 118A and 11B. The air bag 145 supplies and exhausts air into and from the air bags 118A and 118B through the supply and exhaust pipes 142 and 143.

The air bags 110A, 118B, and 145 may be made of elastic rubber or resin, or nylon, vinyl, etc., so long as the material has superior comfort on the head and is air-impermeable.

The specific movement of the HMD 1 of Example 3 is hereinafter explained.

As in Example 1, the length of the connecting devices 30A and 30B are first extended to expand the diameter of the mounting device 10 to an appropriate size. Once this is done, if the amount of air contained in the air begs 118A, 118B, and 145 is reduced beforehand, the air bags 118A, 118B, and 145 never interrupt expansion of the diameter of the mounting device 10.

Then, after the HMD 1 is set at an appropriate position of the head where it should be mounted, the pad member 26 is pressed to the forehead, and the pad member 24 is pressed to the vertex. The handle 38 is then turned to fasten the forehead, back portion, and temporal regions of the head as appropriate, as in Example 1.

Next, the compressor (not shown) in activated to supply air into the air bag 145 through the supply and exhaust pipe 141 and to supply air into the air bags 11BA and 118B through the supply and exhaust pipes 142 and 143. This causes the air bags 145, 118A, and 118B to expand and fill the openings formed between the head and the respective frames depending upon the forms of the player's head and the frames. Therefore, the player can put the HMD 1 an his/her head with further improvement in certainty, regardless of the shape of the player's head. As a result, even if the head is moved fiercely, the HMD 1 never slips off the head. Moreover, since the pad member 26 is pressed to the forehead, the air bags 118A and 118B to the temporal regions, the air bag 145 to the back portion of the head, and the pad member 45 to the vertex, superior comfort can be obtained.

After the player confirms that the HMD 1 does not slip off by fierce movement of the head, the player stops the action of the compressor.

On the other hand, in order to take the HMD 1 off the head, after activating the compressor by opening a release valve (not shown) to exhaust air from the air bags 118A, 118B, and 145, the player pulls the handle 38 to expand the diameter of the mounting device 10, as in Example 1.

In Example 3, explanations are given about the construction in which the air bags 118A. 118B, and 145 are provided on the inside surface (along the inner periphery) of each frame shown in Example 1. However, without limitation to the above construction, the air bags of this invention may be applied to any type of HMD.

Moreover, in Example 3, explanations are given about the case in which the air bags are provided at the positions corresponding to the temporal regions and the back portion of the head. However, without limitation to this, the air bag may be provided, for example, over the entire inside surface of the HMD 1 (the area to be in contact with the head), as long as the air bag is provided at positions where it can be pressed at least to the temporal regions.

Further, the cord 46 and the Supply and exhaust pipe 141 may be united and arranged on the same axis or be separately contained in the same outer pipe. They do not necessarily have to be united.

Furthermore, if the cord 46 and the supply and exhaust pipe 141 are united, it is possible to simplify the construction of the HMD 1 and to prevent the supply and exhaust pipe 141 from disturbing the player.

Also, if the air bags and the supply and exhaust device are provided, it is possible to adjust the fastening strength gently according to the amount of air with no abrupt changes in strength, to definitely prevent the HMD from slipping off in the horizontal direction, and to realize further improved comfort when the HMD is worn on the head, Also. the pressure changes according to the amount of air makes it possible to fasten the HMD to the head under a desired pressure, to automatically control the fastening operation, and to force the air to be exhausted in emergencies.

EXAMPLE 4

Example 4 of the invention is hereinafter explained with reference to the drawings.

Figure 34:
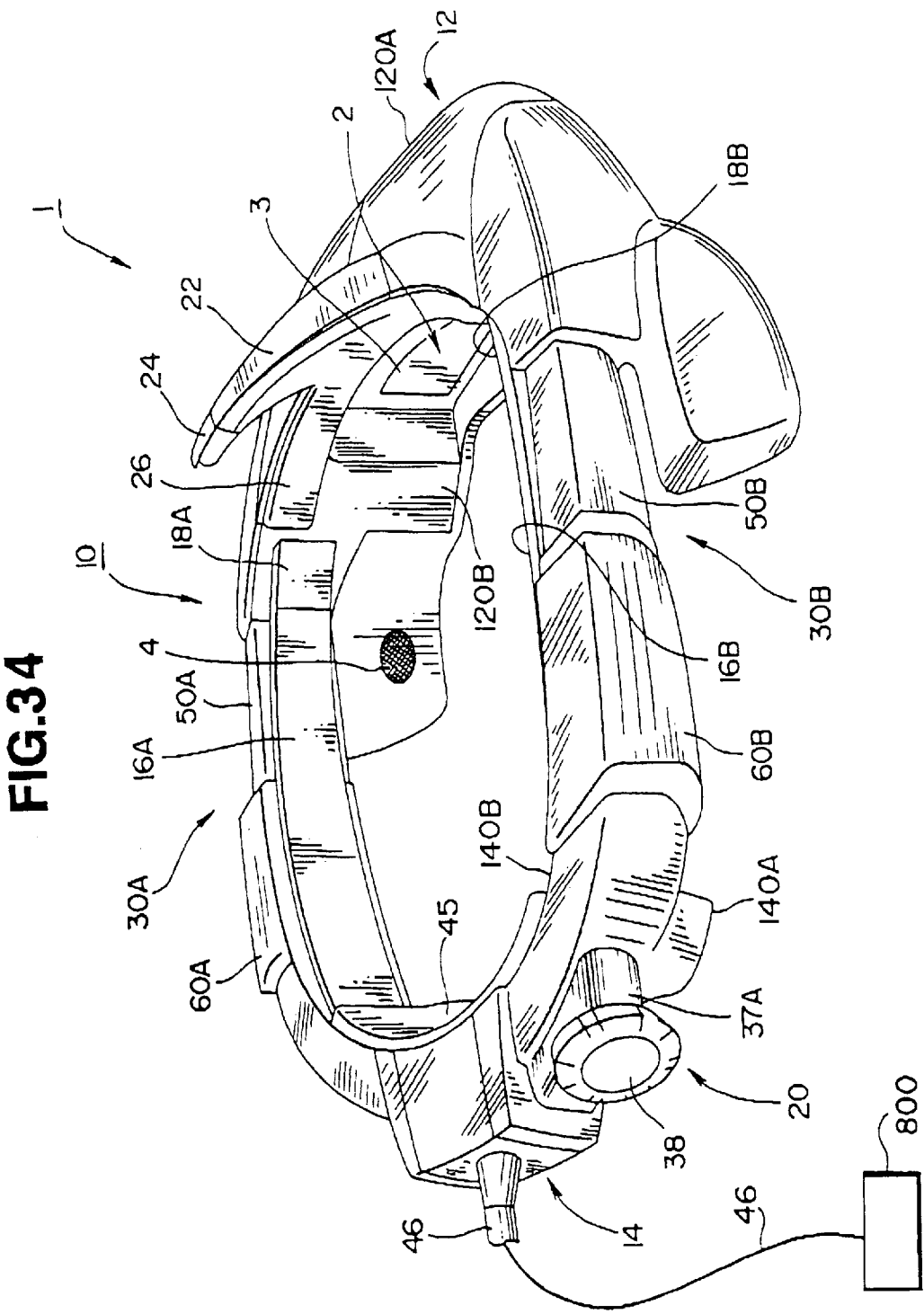
FIG. 34 is a perspective view of the HMD of Example 4 of the invention.

In Example 4, the display device 2 of the invention is hereinafter explained in further detail with reference to FIGS. 34 through 53. The same members described in the above examples are given the same numerals, and explanations of such members are omitted, As shown in FIG. 34, an image control device 800 is connected to the display device 2 via the cord 46. On this display device 2, image display units 850 shown in FIGS. 35 through 41 are provided.

The image control device 800 processes picture signals, outputs the picture signals to the image display units 850 positioned respectively opposite to the right and left eyes, and outputs signals for adjusting the position of the display units, which controls the linear and swivelling movement of the image display units 850.

An operation panel (hereinafter described with reference to FIG. 42) for outputting operational signals for the linear movement of the image display units 850 is attached to the image control device 800. As will be explained later in detail, the linear movement of the image display units 850 means a linear movement of the right and left units moving closer to each other or moving away from each other, and the swivelling movement of the image display units 850 means a movement of adjusting the angle formed by the optical axes of the image display units 850.

Figure 35:
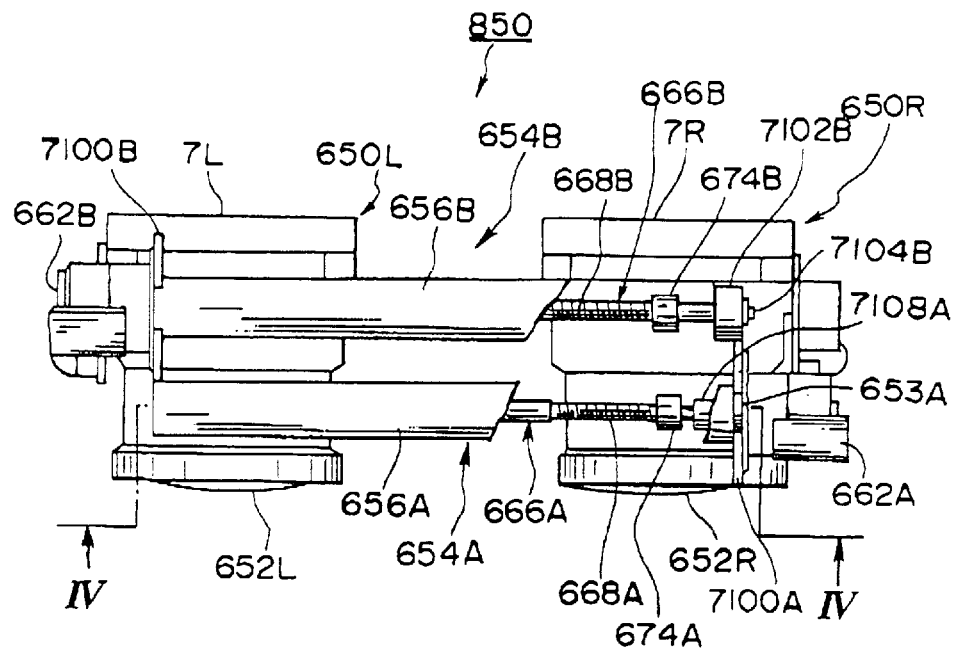
FIG. 35 is a top view of the image display units according to Example 4 of the invention, a part being cut away.
Figure 36:
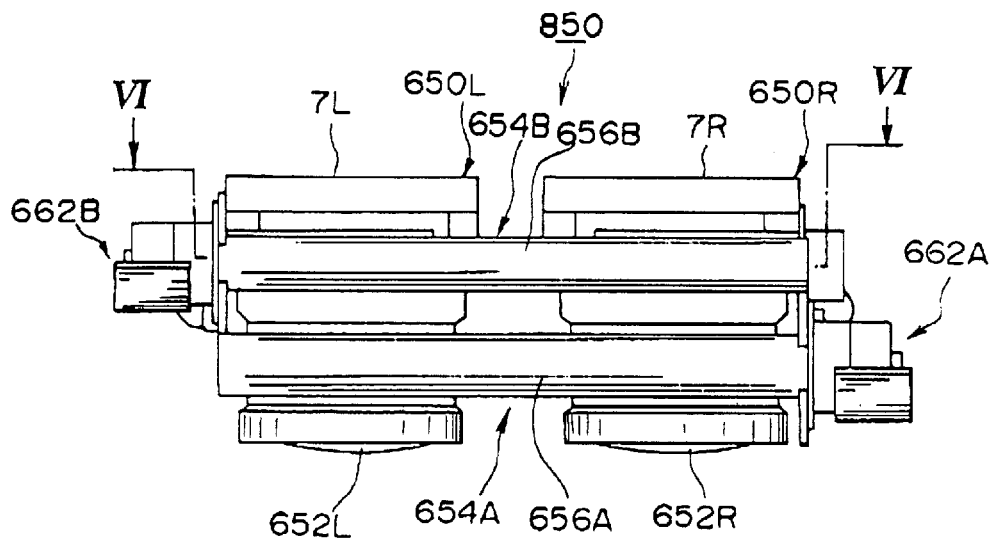
FIG. 36 is a plan view of the image display units of Example 4 of the invention.

FIGS. 35 and 36 show the image display units 850. FIG. 35 is a top view of a right image display unit 650R and a left image display unit 650L, a part being cut away, which are positioned away from each other. FIG. 36 is a top view of the right image display unit 652R and the left image display unit 650L which are positioned close to each other.

In these drawings, the image display unit for the right eye is indicated as Numeral 650R and the image display unit for the left eye is indicated as Numeral 650L. In the following explanations, the letter "R" at the end of a numeral means that a member defined with such numeral is for the right eye, and the letter "L" at the end of a numeral means that a member defined with such numeral is for the left eye.

The right and left image display units 650R and 650L are respectively cylindrical, and liquid-crystal display panels 7R and 7L are provided at their respective front ends. At the other and, closer to the eyes, of the image display units 650R and 650L, magnifying lenses 652R and 652L are provided.

Picture signals are inputted from the image control device 800 through the cable 46 to the right and left liquid-crystal panels 7R and 7L, thereby reproducing and displaying predetermined images. The images are displayed for the right and left eyes through the magnifying lenses 652R and 652L.

Support members 654A and 654B support the right and left image display units 650R and 650L. These support members 654A and 654B comprise: two shafts 666A and 666B positioned in parallel to each other: and support panels 656A and 656B for these shafts. In the following explanations, the letter "A" at the end of a numeral means that the member given such numeral is positioned on the base-end side of the image display unit, and the letter "B" at the end of a numeral means that the member given such numeral is positioned on the front-end side of the image display unit.

Figure 37:
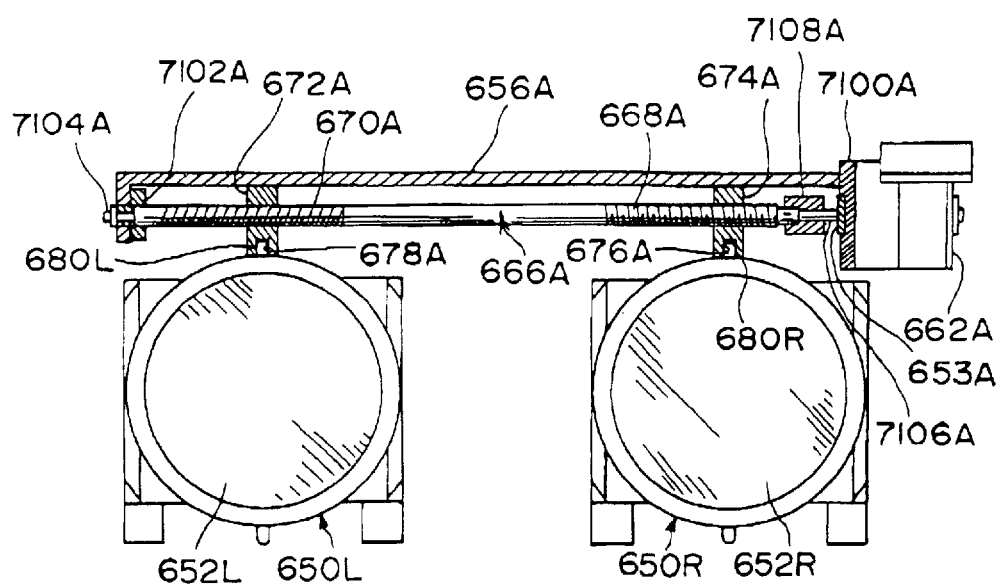
FIG. 37 is a sectional view of the image display units taken through line IV—IV of FIG. 35.
Figure 38:
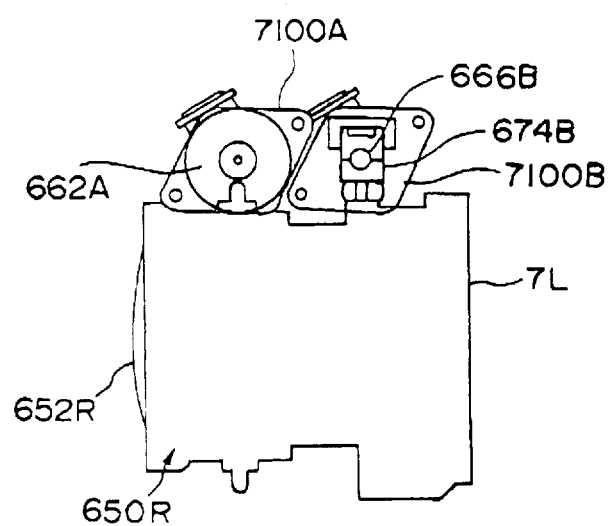
FIG. 38 is a right side view of the image display units of Example 4 of the invention.

As shown in FIGS. 37 and 38, the side end 653A of the support panel 656A on the side of the display unit for the right eye 650R is secured by a small panel 7100A, and an electric motor 662A is secured by the small panel 7100A. Similarly, as shown in FIGS. 39 and 40, the side end 653B of the support panel 656B on the side of the display unit for the left eye 650L is secured by a small panel 7100B, and an electric motor 662B is secured by the small panel 7100B. In FIG. 39, an illustration of the image display units 65OR and 650L is omitted.

As shown in FIG. 37, a bearing 7102A is formed at one end of the support panel 656A. A small-diameter portion 7104A formed at one end of the shaft 666A is supported by the bearing 7102A, and the other end of the shaft 666A is connected to a rotary shaft 7106A of the motor 662A through a Joint 7108A. As shown in FIGS. 35, 39. and 40, a bearing 7102B is formed at one end of the support panel 656B. A small-diameter portion 7104B formed at one end of the shaft 666B is supported by the bearing 7102B, and the other end of the shaft 666B is connected to a rotary shaft 7106B of the motor 662B through a joint 7108B. Due to this construction, as the electric motors 662A and 662B rotate, the shafts 666A and 666B rotate simultaneously.

The shaft 666A supports the base-end side (closer to the eyes) of the image display units 650R and 650L, and the shaft 666B supports the front-end side (the front side of the HMD 1) of the image display units 650R and 650L. As shown in FIGS. 37, 39 and 40, securing pieces 672A, 674A, 672B and 674B are provided at the top of the respective image display units 650R and 650L on both the front-end and base-end sides in order to suspend the image display units 650R and 650L from the shafts 666A and 666B and to support the image display units 650R and 650L at such position.

Figure 41:
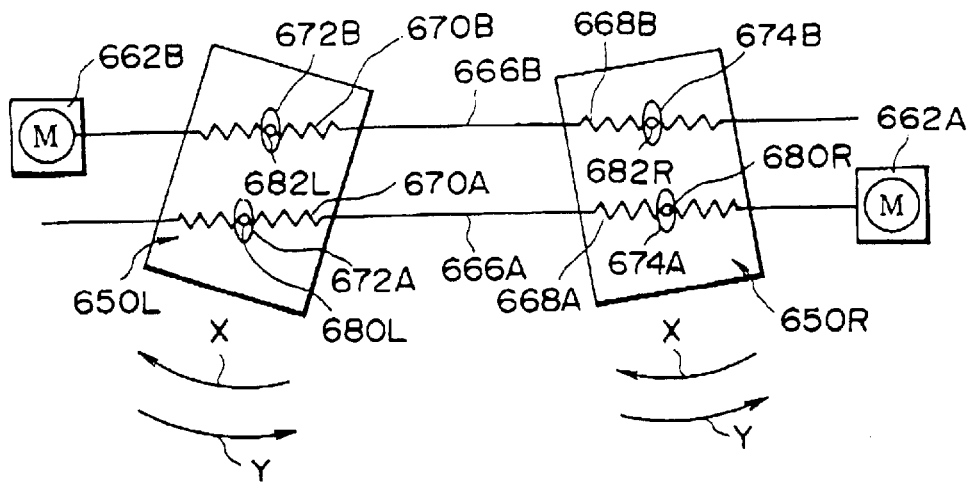
FIG. 41 is a plan view showing the principal of Adjusting the positions of the image display units for right and left eyes according to Example 4 of the invention.

As shown in FIGS. 37 and 41, engagement recesses 678A, 676A, 678B and 676B are formed at the lower ends of the respective securing pieces 672A, 674A, 672B and 674B. In other words, the engagement recess 676A is formed on the securing piece 674A, and the engagement recess 678A is formed on the securing piece 672A. The engagement recess 676B is formed on the securing piece 674B, and the engagement recess 678B is formed on the securing piece 672B. Projections 680R, 680L, 682R and 682L (see FIG. 37) formed on the top surfaces of the respective display units 650R and 650L on both front-end and base-end sides are inserted into and engaged with the engagement recesses 676A, 676B, 678A and 678B in a manner such that the image display units can freely swivel. This makes it possible to adjust the angles formed by the optical axes of the image display units 650R and 650L.

As shown in FIGS. 37, 39 and 40, at both ends of the respective shafts 666A and 666B, male screws 668A and 668B to be screwed in one direction and male screws 670A and 670B to be screwed in the opposite direction are formed, both of which are in en inverse screwing relationship to each other. Regarding the shaft 666A, the male screw 668A is screwed in the securing piece 672A, and the male screw 670A is screwed in the securing piece 672B. Regarding the shaft 666B, the male screw 668B is screwed in the securing piece 672B, and the male screw 670B is screwed in the securing piece 674B.

In the image display units 850 constructed in the above-described manners the shafts 666A and 666B rotate as the motor 662A and 662B rotate. Then the securing pieces 672A, 674A, 672B and 674B screwed by the male screws 668A and 668B of the shafts 666A and 666B move along the shafts 666A and 666B. Accordingly, it is possible to move the right and left image display units 650R and 650L closer to each other or away from each other along the shafts 666A and 666B by controlling the rotating direction of the motors. Namely, it is possible to control the linear movement of the image display units 650R and 650L. Moreover, it is possible to control the right and left image display units 650R and 650L so that they swivel while being secured at the shafts 666A and 666B.

Figure 42:
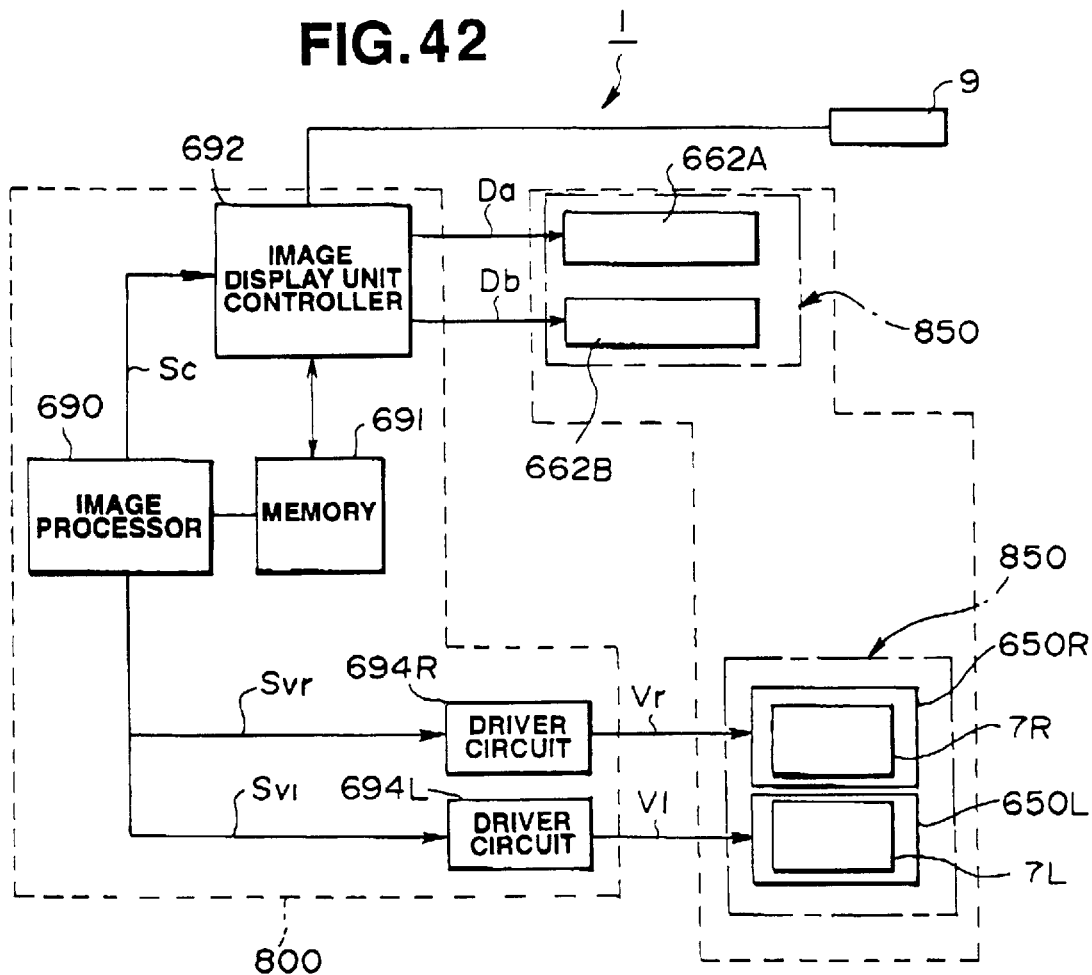
FIG. 42 is a block construction diagram of the image display system of Example 4 of the invention.

FIG. 42 shows a block configuration of the image display system of Example 4. The image control device 800 is composed of, for example, a central processing unit (CPU) and a necessary memory, and realizes each function indicated in the drawing. An image processor 690 processes and outputs picture signals Svr and Svl by performing predetermined processing based on predetermined programs and data stored in the memory 691.

This image processor 690 processes position control signals Sc for the image display units 850 according to the content of processing, and outputs such position control signals to an image display unit controller 692. The controller 692 receives the control signals Sc and outputs electric currents Da and Db for rotating and driving motors to drive motors 662A and 662B of the respective display units.

The driver circuits 694R and 694L are the circuits which amplify the picture signals Svr and Svl and outputted picture signals Vr and Vl. Those picture signals Vr and Vl are outputted to the liquid-crystal panels 7R and 7L of the image display units 650R and 650L. As a result, images for the right eye are displayed on the liquid-crystal panel 7R, and images for the left eye are displayed on the liquid-crystal panel 7L.

An operation panel 9 is connected to the controller 692. With the operational inputs which are inputted from the operation panel 9, it is possible to control the linear movement of the image display units 650R and 650L, and to adjust the distance between the image display units 650R and 650L to correspond with the distance between the eyes of each player.

Explanations are hereinafter given about the operation of the invention constructed In the above-described manner according to Example 4.

<Adjustment of Distance between the eyes>

Figure 43:
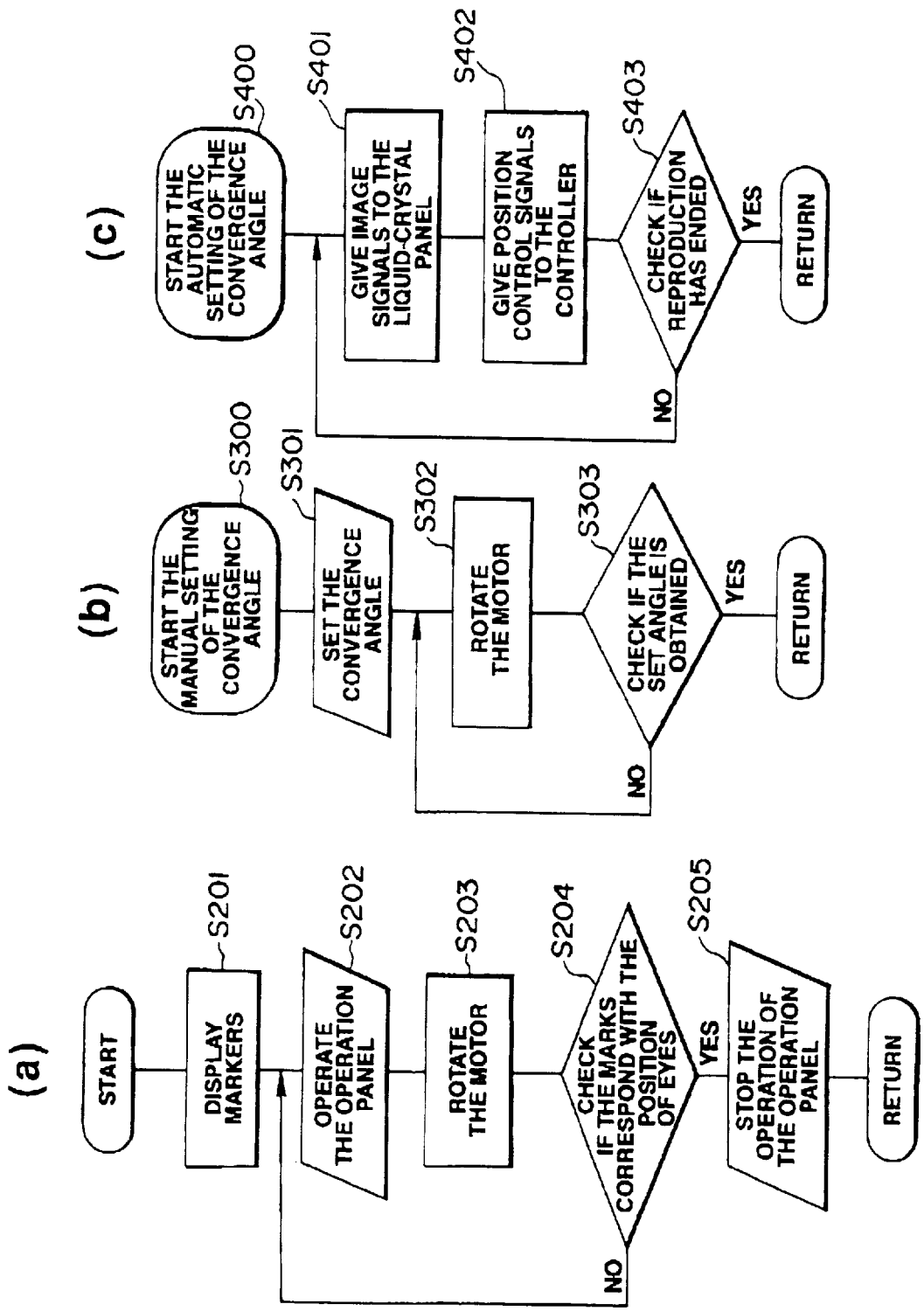
FIG. 43 is a flow chart explaining the operations of the image display system of Example 4 of the invention.
Figure 44:
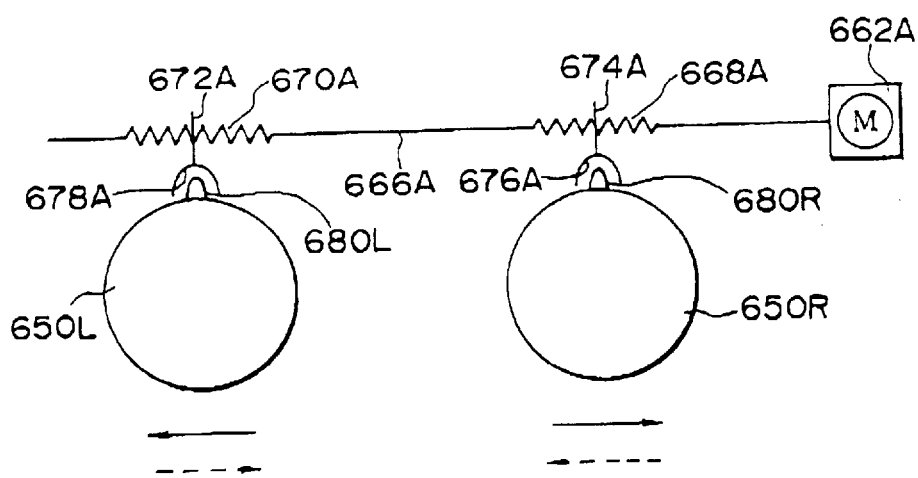
FIG. 44 is a plan view showing the theory of adjusting the positions of the Image display units for right and left eyes according to Example 4 of the invention.

Explanations are hereinafter given about the operations of the HMD 1 in order to adjust the distance between the image display units 650R and 650L to correspond with the distance between the eyes, with reference to the flow chart (a) of FIG. 43.

First, after a player mounts and fixes the HMD 1 on the head, the image processor 690 (see. FIG. 42) outputs standard picture signals, including markers, to the liquid-crystal panels 7L and 7R of the image display units 650R and 650L, thereby displaying standard image pictures on the liquid-crystal panels 7L and 7R (S201).

As the player watches the standard image pictures separately displayed for the right and left eyes, he/she operates the operation panel 9 to move the markers until they correspond with the positions of the right and left eyes (S202).

The controller 692 generates the driving electric currents Da and Db according to the operational signals from the operation panel 9, and supplies the driving electric currents separately to the motors 662A and 662B of the right and left image display units 650R and 650L to rotate the motors 662A and 662B a predetermined amount (S203).

In other words, when the operational signals given from the operation panel 9 command a positive rotation. the controller 692 makes the motors 662A and 662B rotate in a positive direction. Alternatively, when the operational signals given from the operation panel 9 command an inverse rotation, the controller 692 makes the motors 662A and 662B rotate In an inverse direction.

Figure 45:
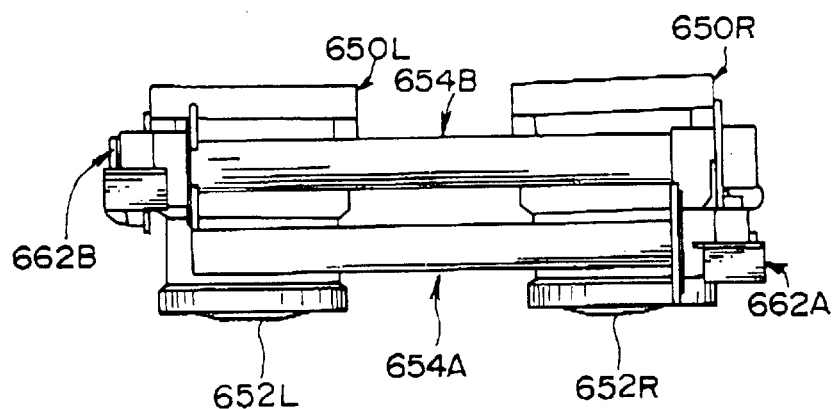
FIG. 45 is a plan view of the image display units showing the operation of adjusting the distance between the eyes according to Example 4 of the invention.
Figure 46:
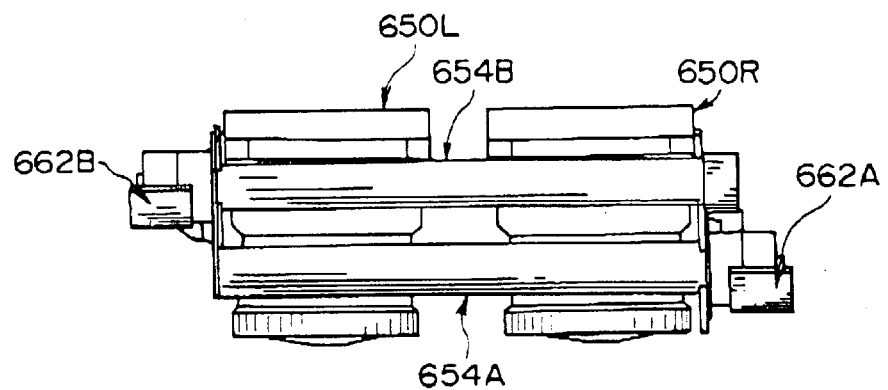
FIG. 46 is a plan view of the image display units showing the operation of adjusting the distance between the eyes according to Example 4 of the invention.

For example, if the distance between the player's eyes is short, the operation panel 9 is operated to make both the motors 662A and 662B rotate in a position direction. Since the male screws 668A and 670A are in an inverse screwing relationship to one another, the securing pieces 672A and 674A move in directions to come closer to each other along the shaft 666A. Similarly, since the male screws 666B and 670B are in an inverse screwing relationship to one another, the securing pieces 672B and 674B move in directions to come closer to each other along the shaft 666B (see FIG. 44). As a result, the image display units 650R and 650L move closer to each other. For example, if the distance between the display units (corresponding to the distance between the eyes) is initially set as 75 mm as shown in FIG. 45, the distance between the Image display units 650R and 650L becomes 55 mm. On the other hand, when the distance between the image display units 65OR and 650L is to be made longer, both the motors 662A and 662B should only be rotated in the opposite direction.

When the markers projected from the liquid-crystal panels 7R and 7L do not come to the positions corresponding with the positions of the eyes even if the display units 650R and 650L are moved linearly by operating the operation panel 9 (S204: NO), the player continues to operate the operation panel 9, and tho controller 692 thereby causing the motors 662A and 662B to rotate in accordance with the operation signals (S202–S204).

When the markers projected from the liquid-crystal panels 7R and 7L come to the positions corresponding with the positions of the eyes by operation of the operation panel 9 by the player (S204: YES), the player stops the operation of the operation panel 9 (S205). Through the above operations, the player can accurately recognize that the distance between the image display units 650R and 650L corresponds with the distance between the player's eyes.

Incidentally, the distance between the eyes for each player may be measured in advance, and such measured values may be inputted to the display units through the operation panel 9. If the distance between the eyes is previously known, this distance value may be directly inputted. Moreover, as for markers, any physical material may be utilized, and the player may adjust the distance between the eyes by watching such markers.

A predetermined memory 691 of the display system shown in FIG. 42 can be constructed so as to store the distance between the image display units 650R and 650L, that is, the distance between the eyes for each person so that, once such distance is stored, the stored distance between the eyes can be immediately reproduced by specifying the identity of each player.

<Manual Adjustment of the Angle Formed by the Optical Axes of the Image Display Units>

The procedure of manual setting of the angle formed by the optical axes of the image display units 650R and 650L is hereinafter explained with reference to the flow chart (b) of FIG. 43.

As explained above, the distance felt by the player between the eyes and the images changes due to factors such as the distance between the player's eyes and the width of the images. In the following processing, the distance felt between the eyes and the images is maintained to be constant by adjusting the angle formed by the optical axes of the right and left image display units 65OR and 650L according to the distance between the eyes, the width of images, and other factors. For example, upon reproduction of a wide screen (when an image, which is long from side to side, is divided into right and left parts, and the divided images are displayed respectively on the right and left image display units), the player's eyes perceive these images as one image. At this time, the player's right eye is directed to the left end of the right display panel 7R, and the player's left eye is directed to the right end of the left display panel 7L. If the angle formed by the optical axes of the image display panels 650R and 650L is made constant, the player's right and left eyes are directed toward the inside, thereby expanding the convergence angle and shortening (changing) the distance felt between the eyes and the images, which is problematic.

Figure 47:
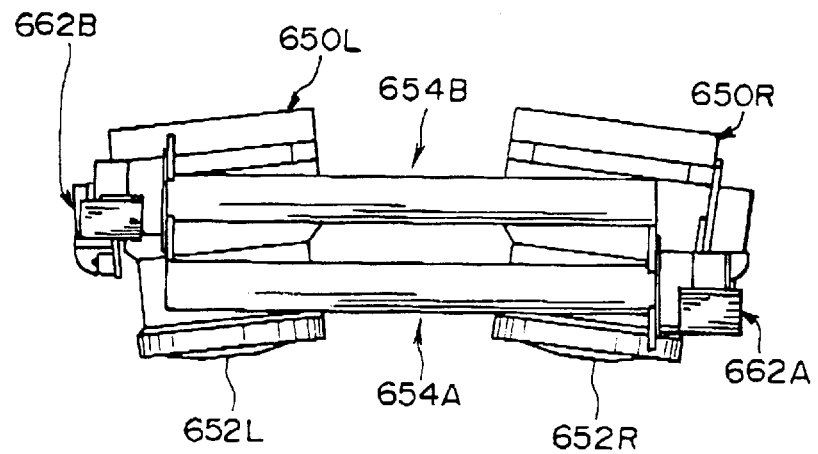
FIG. 47 is a plan view of the image display units showing the operation of adjusting the angle formed by the optical axes of the units according to Example 4 of the invention.

Therefore, in the HMD of the present invention, changes in the convergence angle is prevented and the distance felt between the eyes and the images is maintained to be constant by adjusting the angle formed by the optical axes of the image display panels 7R and 7L. Namely, upon the reproduction of a wide screen, by turning the image display units 650R and 650L toward the outside, that is, away from each other as shown in FIG. 47, it is possible to offset the movement of the lines of sight turning to the inside. Since the ends of the lens Bide (base-end side) of the image display units 650R and 650L turn to the inside (that is, they move closer to each other), the lines of sight inwardly directed passes through the central portions of the respective lenses 652R and 652L. Since the best optical characteristics of a lens are generally obtained around its central portion, optimum images can always be realized by using this invention.

Upon the reproduction of a full three-dimensional image, as the player perceives images by overlapping the right and left images, the angle of view of the images becomes narrow. In this case, since the right and left eyes of the player move to the respective central portions of the liquid-crystal panels 7R and 7L, the convergence angle becomes small. However, by swivelling both the image display units 650R and 650L to put them parallel with each other, it is possible to avoid changes in the convergence angle and to keep the distance felt constant. Moreover, Since the lenses of the image display units 65OR and 650L are set at positions almost directly opposite to the player's lines of sight, the player's lines of sight pass through the central portions of the lenses. Accordingly, good images can always be obtained.

The procedure for adjusting the angle formed by the optical axes of the image display units 650R and 650L is hereinafter explained.

After the distance between the image display units 650R and 650L in adjusted to correspond with the distance between the player's eyes, the processing of S300 and the following steps should be performed before displaying images. If the angle formed by the optical axes of both the units is previously determined depending on the images to be projected, this angle is inputted into the operation panel 9 (S301). The controller 692 generates driving electric currents Da and Db according to the angle inputted and supplies the driving electric currents Da and Db to the motors 662A and 662B (S302), thereby rotating the image display units 650R and 650L and making the angle formed by the optical axes of both the units correspond with the angle inputted.

The above movement can be realized, for example, in the following manner, The controller 692 stops or slightly rotates the motor 662A and simultaneously rotates the motor 662B in a predetermined amount in an inverse or positive direction. The image display units 650R and 650L then move closer to or away from each other on their base-end side, and then swivel in the direction shown as the arrow X or Y In FIG. 41. As a result, the angle formed by the optical axes of the image display units 650R and 650L can be set at a desirable value. Incidentally, either the front-end side only or both the front and base-end sides may be swivelled.

In other words, by supplying the driving electric currents Da and Db from the controller 692 to the respective motors 662A and 662B, the motors 662A and 662B are made to rotate continuously (S302 and B303: No). When the motors 662A and 662B have rotated in a predetermined amount and the image display units 650R and 650L are made to be inclined at a predetermined angle against each of the right and left eyes (S303: YES), the controller 692 ceases supplying the driving electric currents Da and Db to the motors 662A and 662B (S304).

Figure 48:
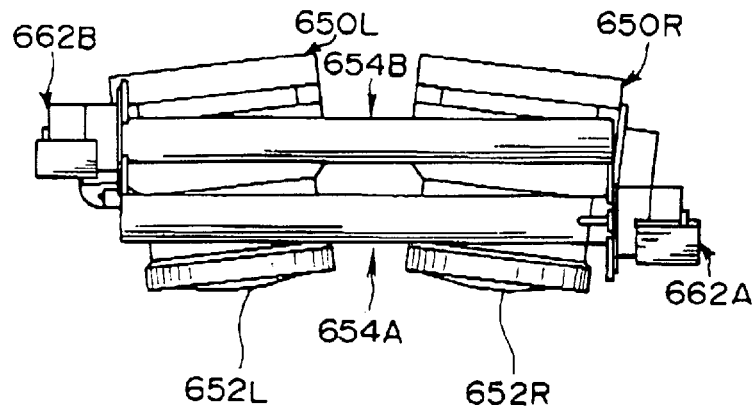
FIG. 48 is a plan view of the image display units showing the operation of adjusting the angle formed by the optical axes of the units according to Example 4 of the invention.

As a result, the image display units 65OR and 650L are finally set at a predetermined angle as shown in FIGS. 47 and 48. FIG. 47 shows an example of the image display units 650R and 650L for which, for example, the ratio of the screen is 5:3 and the distance between the eyes is set as 75 mm and FIG. 48 shows an example of the image display units 650R and 650L for which, for example, the ratio of the screen is 5:3 and the distance between the eyes is set as 55 mm Referring to FIGS. 49 and 50, explanations are hereinafter given about how to set the image display units'650R and 650L at a predetermined angle.

Figure 49:
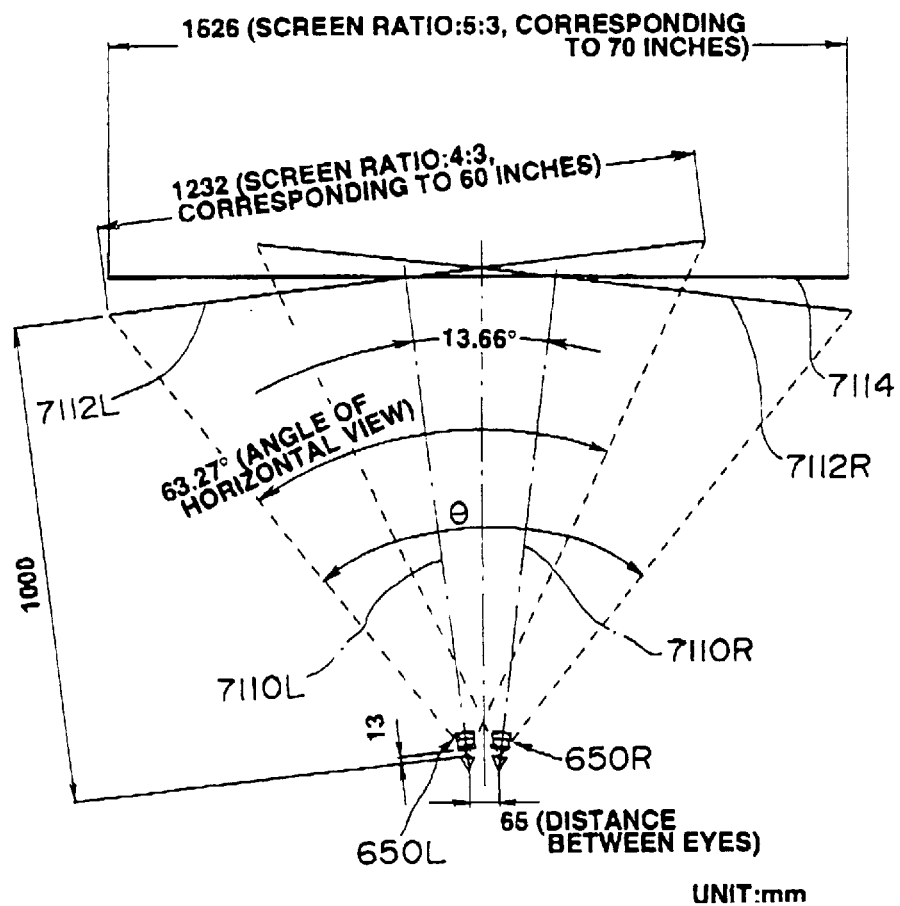
FIG. 49 is a diagram showing the principal of the synthesizing of images by the image display units according to Example 4 of the invention.

FIG. 49 shows the image display units 650R and 650L for which the distance between the eyes is met as 65 mm and the angle formed by the optical axes is set as 13.66°.

By setting the image display units 650R and 650L at the angle (13.66°) indicated in FIG. 49, the right eye's line of sight 7110R and the left eye's line of sight 7110L are determined according to the orientation of the image display units. Therefore, the convergence angle can always be maintained at a constant value (about 3.72°) and the distance felt between the eyes and the images can also be kept constant.

If the liquid-crystal panels 7R and 7L are placed respectively at approximately the focal length of the magnifying lenses, images with the angle of horizontal view at 63.27° can be obtained for each eye (Numeral 7112R is the image for the right eye and Numeral 7112L is the image for the left eye). Theme images for the eyes are synthesized, and a binocular image 7114 is set at the position 1000 mm away from the visual point.

In the above situation, a screen 1232 mm wide (ratio of screen: 4:3 which corresponds to 60 inches) is displayed for one eye. However, human eyes perceive a full image by overlapping the duplicate portions in the images displayed on the respective eyes and, therefore, recognize a screen 1526 mm wide (ratio of screen: 5:3 which corresponds to 70 inches) as a whole. Because of the existence of the overlapped image portions, the screen can be recognized as a three-dimensional image. The focal length of the magnifying lenses and the distance between the liquid-crystal panels and the magnifying lenses are previously set so that visual characteristics such as a predetermined angle of horizontal view (for example, each of the characteristics shown in FIG. 49) can be exhibited.

Figure 50:
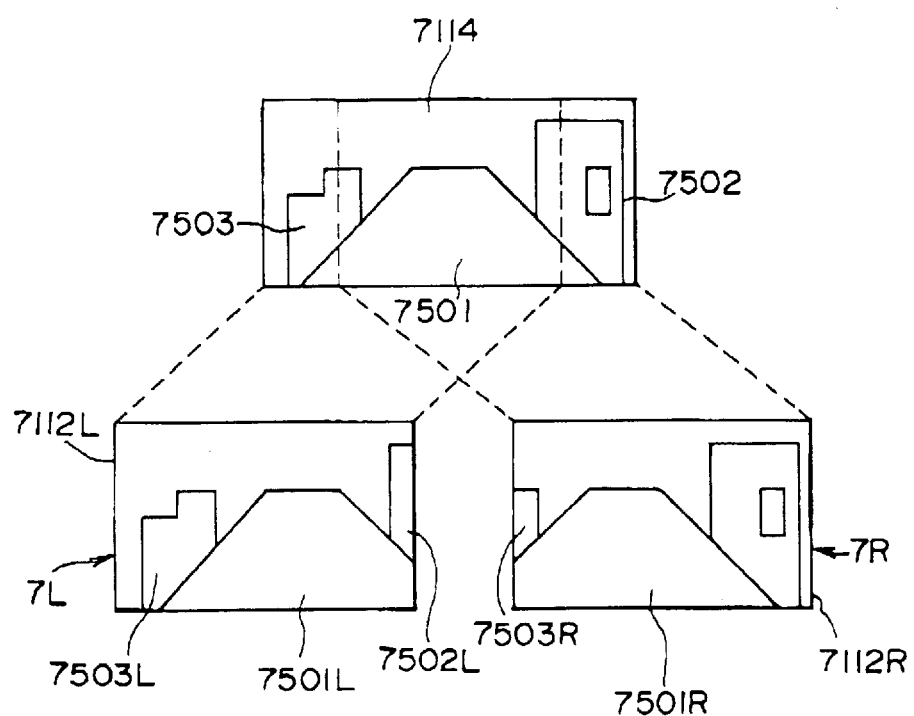
FIG. 50 is an explanatory view of an image screen created by the operation of the synthesizing of images as shown in FIG. 49.

As shown in FIG. 50, when the image processor 690 sends picture signals through the driver circuits 694R and 694L to the liquid-crystal panels 7R and 7L of the image display units 650R and 650L for which the angle formed by the optical axes of both the units and the distance between the eyes are set as described above, the image for the right eye 7112L and the image for the left eye 7112L are displayed respectively on the liquid-crystal panels 7R and 7L.

There is a character 7501L located at almost the middle of the image 7112L displayed on the liquid-crystal panel 7L, and the same character 7501R also exists in the image 7112R on the liquid-crystal panel 7R Moreover, a character 7502L, which is a part of the character 7502R in the image 7112R, exists in the image 7112L, while a character 7503R, which is a part of the character 7503L in the image 7112L, exists in the image 7112R. Namely, the images 7112R and 7112L have partly duplicate portions.

The player recognizes these images 7112R and 7112L as a binocular image 7114 which is the synthesized image of the above two images. The image 7114 is recognized as a wide screen with an expanded angle of visibility (angle obtained by adding the angles of horizontal view of both eyes: θ in FIG. 49), and respective characters are completely synthesized and are recognized as complete characters 7501 through 7503. Since the portion of the image partitioned with dashed lines is the image obtained by synthesizing the images displayed on the respective eyes, it is recognized as a three-dimensional image. Namely, such image is recognized as if a combination of flat and three-dimensional images is projected from the same apparent screen.

Figure 51:
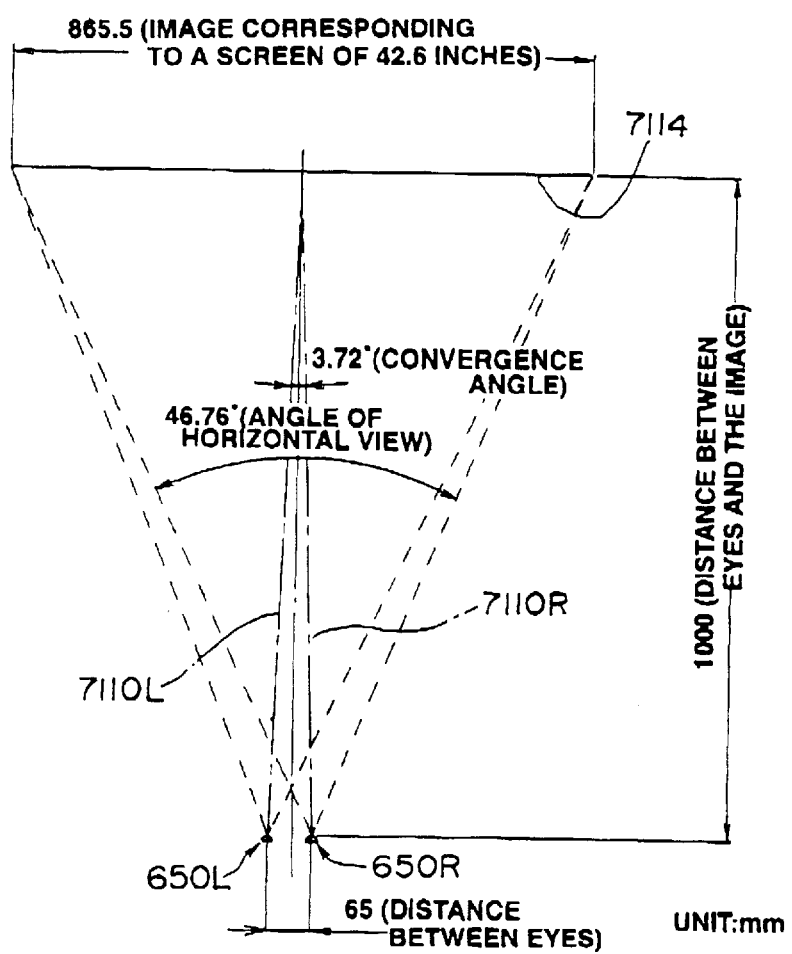
FIG. 51 is a diagram showing the principal of another embodiment for the synthesizing of images by the image display units according to Example 4 of the invention.

FIG. 51 shows the image display units 650R and 650L for which the distance between the eyes in set as, for example, 65 mm and the convergence angle is set as, for example, 3.72°. When the angle of horizontal view of the respective display units 650R and 650L is set as 46.76° so that an image is projected at the position about 1000 mm away from the visual point, a screen 865.5 mm wide (corresponding to 42.6 inches) is formed as a binocular image. As a result, almost the entire areas of the images of the respective eyes overlap with each other and the entire binocular image is recognized as forming almost one three-dimensional image. At this point, the convergence angle does not change, but remains at 3. 72°.

Figure 53:
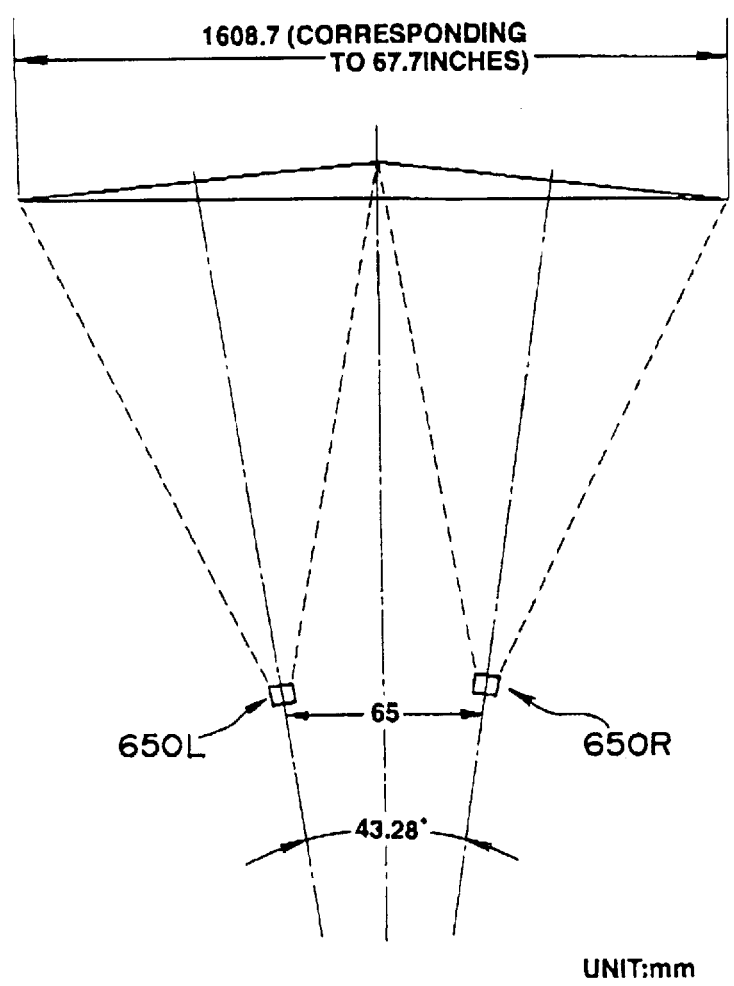
FIG. 53 is a diagram showing the principal of the synthesizing of images by the image display units according to Example 4 of the invention.

FIG. 53 shows the image display units for which the distance between the eyes is set as, for example, 65 mm and the angle formed by the optical axes of both the units is set as, for example, 43.28°. When each angle of horizontal view of the image display units 650R and 650L is set as 46.76° and an image is to be projected at a position about 1000 mm away from the visual point, a screen 1608.7 mm wide (corresponding to 67.7 inches) is formed as the binocular image. In the above situation, since the angle formed by the optical axes of both the units is 43.28°, the images of the respective eyes are recognized as an image in a full wide state (full flat picture image) with no overlapping portions.

Adjustment of the angle formed by the optical axes of the image display units 650R and 650L can be realized by setting a basic axis and by adjusting the angle formed by the basic axis and the respective optical axes of the image display units 650R and 650L. As such basic axes, the aforementioned shafts 666A and 666B and other elements can be selected and used as appropriate. The above-mentioned adjustment of the angle makes it possible to maintain the distance felt between the eyes and the images regardless of the distance between the eyes, the width of the images, or other factors. Moreover, since the lines of sight always pass through almost the central portions of the lenses, it is possible to obtain good images without any optical distortion.

<Automatic Adjustment of the Angle formed by the Optical Axes of the Image Display Units>

Explanations are hereinafter given about the automatic setting of the angle formed by the optical axes of the image display units, with reference to the flow chart (c) in FIG. 43.

As explained above, after the distance between the right and left image display units 650R and 650L is adjusted to correspond with the distance between the eyes, a routine for automatically setting the angle formed by the optical axes of both the units is executed. First at step S400, the image processor 690 reproduces the picture signals Svr and Svl, through processing including the execution of an image display program and read-in of data from the memory 691, and outputs such picture signals Svr and Svl to the liquid-crystal panels 7R and 7L of the display units. A reproduction command of the picture signals Svr and Svl is given by, for example, the operation panel 9. The image processor 690 amplifies the picture signals Svr and Svl at the driver circuits 694R and 694L and outputs the amplified picture signals to each liquid-crystal panel (S401).

The memory 691 stores data for images as well as other information such as the positions and orientations of two cameras, which compose picture signals out of the data for images. Such information includes a camera convergence angle which is the angle formed by lines of weight of two cameras.

The image processor 690 processes the angle formed by the optical axes of the image display units based on the information about the camera convergence angle, generates signals Sc for controlling the positions of the display units, and gives such signals to the controller 692 for driving the display units (6402).

The controller 692 processes a driving electric current for each motor out of the control signals, and generally controls the swivelling movement of the respective image display units 650R and 650L by adjusting the angle formed by the optical axes of the image display units 650R and 650L according to the convergence angle of the cameras in the program The image processor 690 judges whether or not the reproduction of images stored in the memory has ended (S403), and if it has not ended (S403: NO), the processing step S401 and the following steps are repeated. As a result, the angle formed by the optical axes of both the units can be set in accordance with the picture signals, and both the units can be swivelled accurately and quickly to the direction most appropriate for the content and type of the images to be reproduced.

When the image control device 800 supplies the picture signals Vr and Vl and the driving electric currents Da and Db to the image display units 650R and 650L for which the distance between the eyes is set, for example, as 65 mm as shown in FIGS. 49 and 51, the player wearing the HMD 1 on his/her head recognizes the images as follows:

When the picture signals Svr and Svl reproduced at the image processor 690 are data for forming full three-dimensional images, the image processor 690 gives the picture signals Svr and Svl to the driver circuits 694R and 694L and gives the angle-changing-and-controlling signals Sc, all of which should form full three-dimensional images, to the controller 692.

The controller 692 supplies the driving electric currents Da and Db based on the angle-changing-and-controlling signals Sc to the motors 662A and 662B. Since the directions of the driving electric currents Da and Db are inverse, the motors 662A and 662B rotate in opposite directions and the image display units 65OR and 650L are inclined at a predetermined angle.

When the images to be projected are full three-dimensional images (when the right and left images are entirely overlapped with each other), predetermined driving electric currents Da and Db are supplied to the motors 662A and 662B, and the optical axes of the image display units 650R and 650L form an angle as shown in FIG. 51. Accordingly, for example, in the case of the image display units 650R and 650L for which the distance between the eyes is set as 65 mm, when the driving electric currents Da and Db are supplied to the motors 662A and 662B, the image display unit for the left eye 650L turns to the X direction and the Image display unit for the right eye 650R turns to the Y direction as shown in FIG. 41. Then, as shown in FIG. 51, the convergence angle formed by the lines of sight of the player who is wearing the HMD 1 on her head becomes, for example, 3.72°, and the screen which can be seen with both eyes becomes 865.5 mm wide. As a result, the images of the respective eyes substantially overlap with each other and, therefore, a three-dimensional image can be soon over t he entire area of the screen.

Next. when the picture signals Svr and Svl reproduced at the image processor 690 are data for forming partial three-dimension al and wide-angle images, the image processor 690 gives such picture signals Svr and Svl to the driver circuits 694R and 694L As a result, as shown in FIG. 49, the binocular image for the player who is wearing the HMD 1 on her head becomes a wide image, which is 1526 mm wide, as well as a partial three-dimensional Image the central portion of which is formed by the overlapped images. Upon the reproduction of partial three-dimensional images, the image processor 690 supplies the control signals Sc to the right and left motors 662A and 662B in order to maintain a constant convergence angle (about 3.72°).

This causes the image display unit for the left eye 650L to swivel in the Y direction and the image display unit for the right eye 650R to swivel in the X direction, as shown in FIG. 41. Therefore, the angle formed by the optical axes of both the units is set at 13.66° in order to maintain the convergence angle at 3,72° (FIG. 48).

When the picture signals Svr and Svl are the data for forming a full wide screen, the image processor 690 reproduces the picture signals Svr and Svl and sends the picture signals Svr and Svl to the driver circuits 694R and 694L. As a result, a binocular image formed by synthesizing the images on the liquid-crystal panels 7A and 7B or the image display units 650R and 650L, becomes an image in the full wide state with no duplicate portions. In this case, the image display unit for the left eye 650L swivels even further in the Y direction than in the case of a partial three-dimensional image, and the image display unit for the right eye 650R swivels even further in the X direction than in the case of a partial three-dimensional image.

As described above, it is possible to automatically change the angle formed by the optical axes or both units according to the picture signals by storing in the memory 691 the information about the lines of sights of the cameras as the control signals at the time of generation of the picture signals, and by sending the angle-controlling signals Sc to the motors 662A and 662B according to the picture signals Svr and Svl. Therefore, even if the distance between the eyes, the angle of view of the images (width of the images), and other factors change, it is possible to maintain the distant felt between the eyes and the images to be constant by automatically adjusting the angle formed by the optical axes of both the units according to the picture signals. Moreover, the manual operation of adjusting the angle formed by the optical axes of both the units, whenever a player changes, can be avoided by storing data for each player, such as distance between the eyes, in the memory 691.

Other Examples

Figure 52:
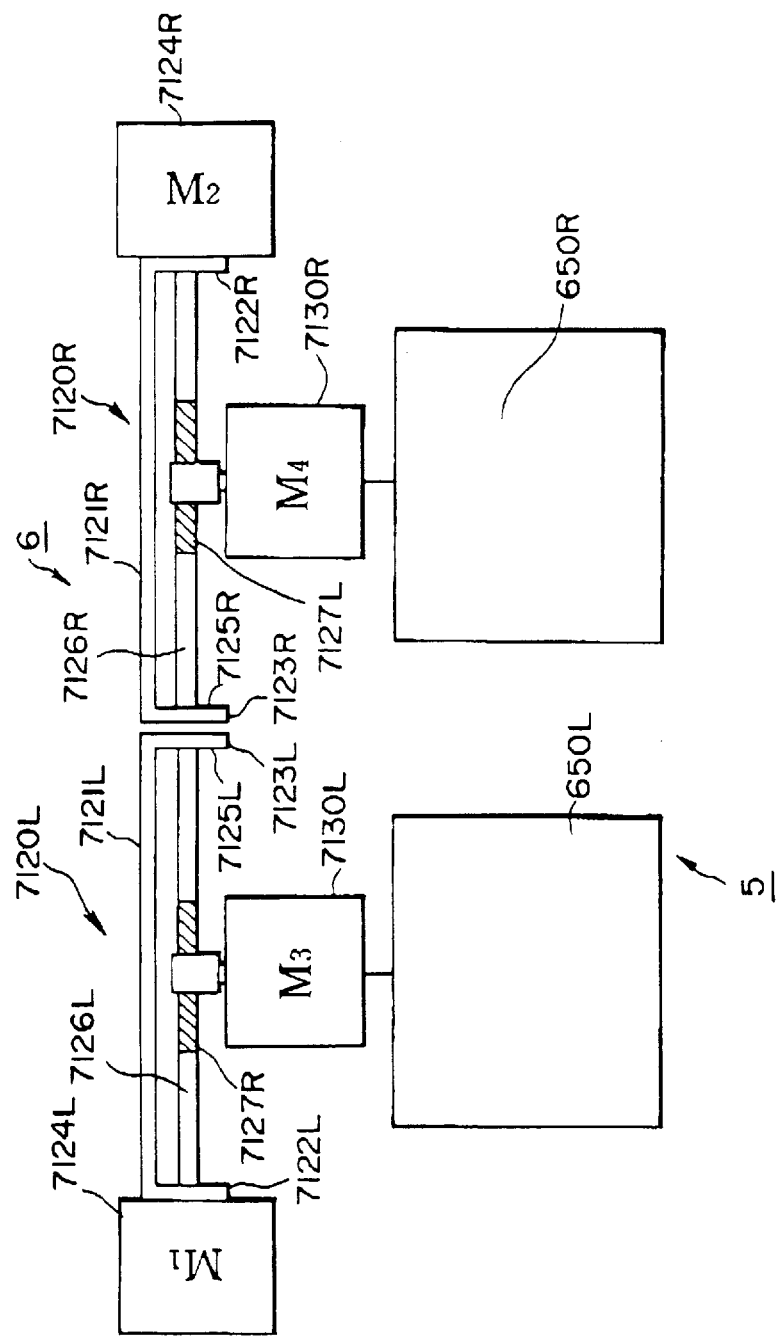
FIG. 52 is a front view of another embodiment of the image display units according to Example 4 of the invention.

FIG. 52 is a front view of another example of the image display units 850 and a position adjustment mechanism 6 therefor.

The position adjustment mechanism 6 shown in FIG. 52 is different from the position adjustment mechanism described in the above examples in that moving members 7120R and 7120L for adjusting the distance between the right and left image display units 650R and 650L are provided independently of rotating members 7130R and 7130L for adjusting the angle formed by the optical axes of the image display units.

The moving member 712OR is constructed as follows: A support panel 7121R. which is composed of a thin rectangular panel, is provided with a motor securing end 7122R at its one end, and with a bearing end 7123R at the other end. A motor 7124R is secured on the motor securing end 7122R, and a shaft 7126R is provided between the rotary shaft of the motor 7124R and the bearing 7125R of the bearing end 7123R. A male screw 7127R in provided in the shaft 7126R. A securing piece 7128R for supporting the image display unit for the right eye 650R is screwed by the male screw 7127R, so that the securing piece 7120R moves to the left or right of FIG. 52 according to the rotating direction of the shaft 7126R.

The moving member for the left eye 7120L is constructed in the same manner as the moving member for the right eye 7120R

The rotating members 7130L and 7130R of the right and left image display units 650R and 650L are constructed by comprising motors which are provided between the securing pieces and the image display units. Accordingly, the image display units 650A and 650B which are supported by the rotary shafts can be swivelled in a predetermined amount by rotating the rotary shafts of the motors.

In the above example, since the positions of the image display units 650R and 650L and the angle formed by the optical axes of the units can be separately adjusted, it is possible to conduct fine adjustment of the distance between the image display units 650R and 650L and the angle formed by the optical axes of both the units to cover differences for each individual person.

Incidentally, in the aforementioned examples, explanations are given about the image display units 650R and 650L which have the liquid-crystal panels on the front-end side and have the magnifying lenses on the base-end side. However, this invention is not limited to such construction, and three-dimensional images may be generated by displaying an image for the right eye and an image for the left eye in turns. In other words, the image display units may be constructed by using, instead of liquid-crystal panels, liquid-crystal shutters which open and close in synchronization with the changes in timing of screens, As described above, a head mounted type image display device of this invention adjusts the distance between the image display device for the right eye and the image display device for the left eye by utilizing a dynamo-electric mechanism in accordance with predetermined wide-angle images or three-dimensional Images to be formed. In other words, when the electric motors connected to the shafts are rotated in a predetermined direction, due to the function of the inverse screws, the image display units 650R and 650L move closer to each other, thereby shortening the distance between them. On the other hand, when the electric motors are rotated in an inverse direction the image display units 650R and 650L move away from each other, thereby lengthening the distance between them. Therefore, the use of such a simple construction enables easy adjustment of the distance between the image display units 650R and 650L to correspond with the distance between a player's eyes. Since the adjustment amount of the distance between the image display devices and the angle formed by the optical axes of these image display devices can be decided on the basis of the rotation amount of the electric motors, it is possible to adjust the position accurately.

Furthermore, since the angle formed by the optical axes of the image display units 650R and 650L can be adjusted by the use of the same construction, it is possible to reproduce desirable wide-angle images, three-dimensional images, or combined images thereof accurately and quickly. Namely, by controlling two shafts 666A and 666B separately so as to make the rotation amount of these shafts different, it is possible to make a movement amount of the image display units 650R and 650L different on the front-end side and on the base-end side. As a result, the angle formed by the optical axes of the image display units 650R and 650L can be adjusted accurately and quickly. In the above-described way, the angle formed by the optical axes of both the units in adjusted according to the distance between the eyes, which is different for each person, and according to the width of the duplicate portions of the right and left screens, thereby making it possible to maintain the distance felt between the eyes and the images to be almost constant.

Furthermore, since each line of sight always passes through the central portion of the lens, good images can be obtained without any optical distortion.

Since the image display system of this invention is capable or automatically adjusting the distance between the image display units 650R and 650L (the distance between the eyes) and the angle formed by the optical axes of both the units according to the picture signals, it is possible to decrease complicated adjustment operations. Therefore, even an ordinary player without any special technical knowledge can use the HMD of this invention.

What is claimed:

1. A head mounted display, comprising:

a front frame which covers a forehead and further comprises a display device mounted on the front side of said front frame;

a back frame which covers the back portion of a head;

connecting means including rails and sliders provided on one of the front and back frames, for connecting the front frame and the back frame, wherein the rails and sliders engage in a manner which permits the front and back frames to move freely toward the back and front of the head;

belts which are placed on the inside surfaces of the front frame, the back frame, and around the inside surfaces facing the temporal regions of the head;

a fastening means mounted on the rear frame, for fastening the belts; and a loosening means mounted on the rear frame, for loosening the fastened belts.

2. A head mounted display, according to claim 1 wherein said fastening means comprises:

racks having teeth opposite to each other which are mounted in the lengthwise direction of said belts;

a pinion which is mounted on said back frame and which engages with said racks; and a shaft having, at its tip portion, an engagement portion which is inserted into and engages with a shaft pocket of said pinion, wherein said racks and pinion engage with each other by ordinarily biasing the tip portion of said shaft against the shaft pocket of said pinion, and such engagement is released by pulling back the tip portion of said shaft in the direction opposite to the biasing direction.

3. A head mounted display according to claim 1, wherein a pair of said belts is provided, each belt has a rack on the side end closer to said fastening means, and said fastening means comprises a pinion to engage with said rack.

4. A head mounted display according to claim 1, comprising pad members which can be pressed to the temporal regions when the head mounted display is mounted on the head.

5. A head mounted display according to claim 1, comprising a pad member which can be pressed to the vertex of the head when the head mounted display is mounted on the head.

6. A head mounted display according to claim 1, wherein said fastening means and loosening means are placed at a position offset from the central portion of the back frame.

7. A head mounted display according to claim 1, wherein a UV cut filter is placed on the front face of the display screen of said display device.

8. A head mounted display according to claim 1, wherein said display device is positioned at a predetermined distance from eyes, and speakers are positioned at a predetermined distance from ears when the head mounted display is mounted on the head.

9. A head mounted display according to claim 1, wherein each said frame comprises a frame body and an outer casing, and said outer casing is constructed in a manner freely attachable to and detachable from said frame body.

10. A head mounted display, comprising:

a front frame which covers a forehead and further comprises a display device mounted on the front side of said front frame;

a back frame which covers the back portion of a head;

connecting means for connecting the front frame and the back frame, in a manner which is freely movable toward the back and front of the head, and comprising:

first engagement members placed on both side ends of said front frame; and second engagement members which are placed on both side ends of the back frame and which move relative to one another toward the back and front of the head in the state of engagement with said first engagement members;

belts which are placed on the inside surfaces of both the front frame and the back frame and around the temporal regions of the head;

a fastening means for fastening the belts; and a loosening means for loosening the fastened belts.

11. A head mounted display according to claim 10, wherein either the first engagement members or the second engagement members comprise a rail, and the other engagement member comprises a slider which moves in engagement with said rail.

* * * * *